(12) United States Patent
Eto et al.

(10) Patent No.: US 11,523,120 B2
(45) Date of Patent: Dec. 6, 2022

(54) TRANSMISSION APPARATUS, TRANSMISSION METHOD, RECEPTION APPARATUS, RECEPTION METHOD, RECORDING APPARATUS, AND RECORDING METHOD

(71) Applicant: Saturn Licensing LLC, New York, NY (US)

(72) Inventors: Hiroaki Eto, Kanagawa (JP); Toshiyuki Ogura, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 16/603,345

(22) PCT Filed: Apr. 16, 2018

(86) PCT No.: PCT/JP2018/015778
§ 371 (c)(1),
(2) Date: Oct. 7, 2019

(87) PCT Pub. No.: WO2018/194040
PCT Pub. Date: Oct. 25, 2018

(65) Prior Publication Data
US 2020/0322614 A1    Oct. 8, 2020

(30) Foreign Application Priority Data
Apr. 17, 2017  (JP) .............. JP2017-081604

(51) Int. Cl.
*H04N 19/154*  (2014.01)
*H04N 19/112*  (2014.01)
(Continued)

(52) U.S. Cl.
CPC ......... *H04N 19/154* (2014.11); *H04N 19/112* (2014.11); *H04N 19/177* (2014.11);
(Continued)

(58) Field of Classification Search
CPC .............. H04N 5/232; H04N 5/23264; H04N 21/2343; H04N 21/4318; H04N 21/236; H04N 7/0127
See application file for complete search history.

(56) References Cited

U.S. PATENT DOCUMENTS 5,454,051 A * 9/1995 Smith ................ H04N 19/86
382/268
7,373,013 B2 * 5/2008 Anderson .............. H04N 5/213
358/463

(Continued)

FOREIGN PATENT DOCUMENTS

EP          1956839 A1    8/2008
JP          2010178124    1/2009
(Continued)

OTHER PUBLICATIONS

Standardized extensions of High efficiency video coding HEVC; Sullivan; 2013. (Year: 2013).*

(Continued)

*Primary Examiner* — Luis Perez-Fuentes
(74) *Attorney, Agent, or Firm* — Chris Kolefas

(57) ABSTRACT

The present technology makes it easy to present an image having appropriate image quality at a receiver side that receives high-frame-rate moving image data.
A video stream obtained by encoding moving image data having a high frame rate is generated. A container containing the video stream is transmitted. Blur control information for controlling blur is inserted into a layer of the container and/or a layer of the video stream. The blur control information gives, for example, weighting coefficients for individual frames in a blurring process for adding image data of neighboring frames to image data of a current frame.

19 Claims, 22 Drawing Sheets

EXEMPLARY SEI ARRAY AS HEVC ENCODED STREAM

(51) Int. Cl.
  *H04N 19/177* (2014.01)
  *H04N 19/46* (2014.01)
  *H04N 21/2343* (2011.01)
  *H04N 21/236* (2011.01)

(52) U.S. Cl.
  CPC ....... *H04N 19/46* (2014.11); *H04N 21/23605* (2013.01); *H04N 21/234381* (2013.01)

(56) References Cited

U.S. PATENT DOCUMENTS

| | | | | |
|---|---|---|---|---|
| 8,063,920 | B2* | 11/2011 | De Haan | G09G 3/20 348/614 |
| 8,378,799 | B2* | 2/2013 | Yim | G06K 7/1473 340/425.5 |
| 8,503,801 | B2* | 8/2013 | Schiller | G06K 9/40 382/228 |
| 8,743,959 | B2* | 6/2014 | Heyward | H04N 19/14 375/240.16 |
| 10,904,592 | B2* | 1/2021 | Tsukagoshi | H04N 21/440281 |
| 2007/0070250 | A1* | 3/2007 | Zhou | H04N 5/145 348/607 |
| 2008/0259169 | A1* | 10/2008 | Nagano | H04N 5/23248 348/208.4 |
| 2009/0268823 | A1* | 10/2009 | Dane | H04N 19/132 375/240.27 |
| 2009/0316009 | A1* | 12/2009 | Ito | H04N 5/243 348/208.4 |
| 2010/0214422 | A1 | 8/2010 | Iwamura et al. | |
| 2010/0290529 | A1* | 11/2010 | Topiwala | H04N 7/0125 375/240.16 |
| 2011/0081132 | A1* | 4/2011 | Iwata | H04N 5/144 386/353 |
| 2014/0093180 | A1* | 4/2014 | Esenlik | H04N 19/597 382/233 |
| 2014/0177706 | A1* | 6/2014 | Fernandes | G06T 3/4053 375/240.03 |
| 2014/0355881 | A1* | 12/2014 | Bhardwaj | G06T 7/0002 382/173 |
| 2015/0195587 | A1* | 7/2015 | Tsukagoshi | H04N 21/4345 725/116 |
| 2015/0341667 | A1* | 11/2015 | Liao | H04L 65/4076 375/240.27 |
| 2016/0330374 | A1* | 11/2016 | Ilic | H04N 5/23222 |
| 2017/0019680 | A1* | 1/2017 | Lee | H04N 19/105 |
| 2018/0089839 | A1* | 3/2018 | Li | G06T 7/248 |
| 2018/0146219 | A1 | 5/2018 | Tsukagoshi | |
| 2018/0167558 | A1* | 6/2018 | Hirai | G09G 5/377 |
| 2018/0213251 | A1* | 7/2018 | Ikonin | H04N 19/82 |

FOREIGN PATENT DOCUMENTS

| | | |
|---|---|---|
| JP | 5102174 B2 | 12/2012 |
| WO | 2007063819 | 6/2007 |
| WO | 2010116731 | 10/2010 |
| WO | 2016190089 A1 | 12/2016 |

OTHER PUBLICATIONS

Working Draft of MPEG Media Transport—Park, 2011. (Year: 2011).*
_ Temporal video filtering and exposure control for motion blur; Stengel;—2014. (Year: 2014).*
_ USPTO library query for NPL; Apr. 2022. (Year: 2022).*
Extended European Search Report with Written Opinion for Application No. 18788541.3 dated Apr. 1, 2020, 9 pages.
International Search Report corresponding to PCT/JP2018/015778, dated Jul. 17, 2018, 2 pgs.

* cited by examiner

FIG. 2
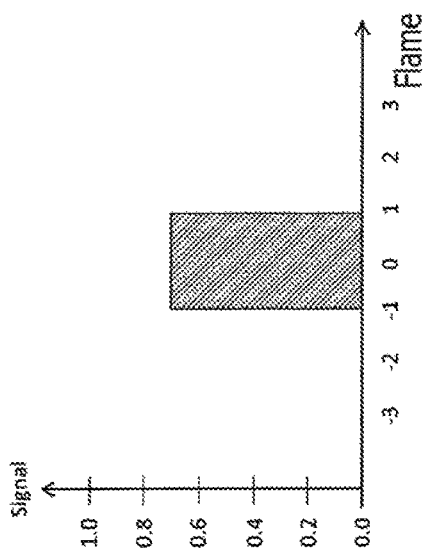
(a)
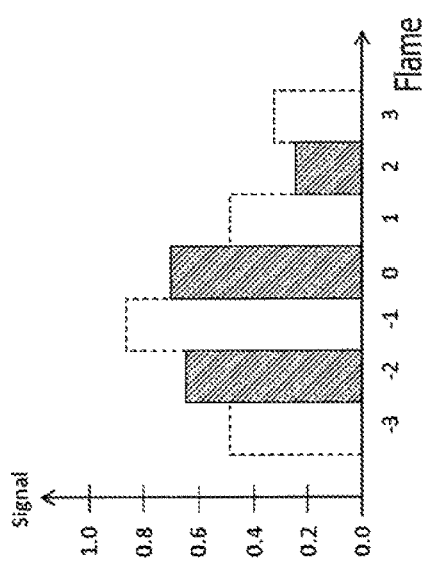
(b)
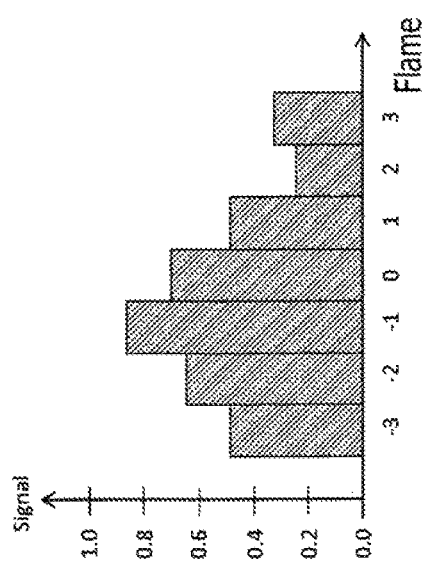
(c)

FIG. 8

EXEMPLARY SEI ARRAY AS HEVC ENCODED STREAM

FIRST ACCESS UNIT OF GOP

| AU Delimiter (1 PIECE) | VPS (1 PIECE) | SPS (1 PIECE) | PPS (1 PIECE) | Prefix_SEIs | Slices (1 OR MORE) | Suffix_SEIs | Filler |

← IDR, BLA

Prefix_SEIs:
| Buffering period SEI message (1 PIECE) | Recovery point SEI message (ONLY IN CASE OF non-IDR) (1 PIECE) | Picture timing SEI message (1 PIECE) |

Suffix_SEIs:
| HFR_blur_control SEI message (1 PIECE) |

FIG. 10

HFR_blur_control SEI

| Syntax | No. of Bits | Format |
|---|---|---|
| HFR_blur_control SEI ( ) { | | |
|   HFR_blur_control_id | ue(v) | |
|   source_frame_rate | 8 | uimsbf |
|   number_of_blur_control_info | 8 | uimsbf |
|   for (j=0; j< number_of_blur_control_info; j++){ | | |
|     display_frame_rate | 8 | uimsbf |
|     function_type | 8 | uimsbf |
|     start_frame | 8 | uimsbf |
|     end_frame | 8 | uimsbf |
|     number_of_frame | 8 | uimsbf |
|     for ( i = 0; i < number_of_frame ; i++ ) { | | |
|       frame_coef(i) | 8 | simsbf |
|     } | | |
|   } | | |
| } | | |

FIG. 11

HFR_blur_control_SEI_semantics

| Field | Size | Description |
|---|---|---|
| source_frame_rate | (8bits) | INDICATES FRAME RATE OF HFR MOVING IMAGE DATA TO BE TRANSMITTED<br>0x01  120Hz<br>0x02  240Hz<br>0x03  480Hz |
| number_of_blur_control_info | (8bits) | INDICATES NUMBER OF PIECES OF BLUR CONTROL INFORMATION TO BE TRANSMITTED |
| display_frame_rate | (8bits) | INDICATES FRAME RATE OF DISPLAY IMAGE DATA<br>0x01  60Hz<br>0x02  120Hz<br>0x03  240Hz<br>0x04  480Hz |
| function_type | (8bits) | INDICATES FUNCTION TYPE<br>0x01 USES CURRENT FRAME AND ITS PRECEDING FRAME (NEGATIVE COEFFICIENT INCLUDED)<br>0x02 USES CURRENT FRAME AND ITS PRECEDING FRAME (NO NEGATIVE COEFFICIENT INCLUDED)<br>0x03 USES CURRENT FRAME AND ITS PRECEDING FRAME AND SUCCEEDING FRAME (NEGATIVE COEFFICIENT INCLUDED)<br>0x04 USES CURRENT FRAME AND ITS PRECEDING FRAME AND SUCCEEDING FRAME (NO NEGATIVE COEFFICIENT INCLUDED) |
| start_frame | (8bits) | INDICATES FIRST FRAME TO BE USED |
| end_frame | (8bits) | INDICATES LAST FRAME TO BE USED |
| number_of_frame | (8bit) | INDICATES NUMBER OF FRAMES TO BE USED |
| frame_coef(i) | (8bits) | INDICATES WEIGHTING COEFFICIENT (FUNCTION VALUE) TO BE USED FOR EACH FRAME |

FIG. 12

HFR_information descriptor syntax (a)

| Syntax | No. of Bits | Format |
|---|---|---|
| HFR_information descriptor () { | | |
| HFR_information descriptor_tag | 8 | bslbf |
| HFR_information descriptor_length | 8 | bslbf |
| HFR_blur_control_SEI_existed | 1 | bslbf |
| reserved | 7 | 0x7f |
| } | | |

HFR_information descriptor semantics (b)

| HFR_blur_control_SEI_existed (1bits) INDICATES WHETHER OR NOT HFR_blur_control_SEI_MESSAGE EXISTS |
|---|
| 1    EXISTENT |
| 0    NON EXISTENT |

FIG. 13

HFR_blur_control Descriptor

| Syntax | No. of Bits | Format |
|---|---|---|
| HFR_blur_control_descriptor( ) { | | |
| descriptor_tag | 8 | uimsbf |
| descriptor_length | 8 | uimsbf |
| source_frame_rate | 8 | uimsbf |
| number_of_blur_control_info | 8 | uimsbf |
| for (j=0; j< number_of_blur_control_info; j++){ | | |
| display_frame_rate | 8 | uimsbf |
| function_type | 8 | uimsbf |
| start_frame | 8 | uimsbf |
| end_frame | 8 | uimsbf |
| number_of_frame | 8 | uimsbf |
| for ( i = 0; i < number_of_frame ; i++ ) { | | |
| frame_coef(i) | 8 | simsbf |
| } | | |
| } | | |
| } | | |

TRANSMISSION APPARATUS, TRANSMISSION METHOD, RECEPTION APPARATUS, RECEPTION METHOD, RECORDING APPARATUS, AND RECORDING METHOD

CROSS-REFERENCE TO RELATED APPLICATIONS

This application is a national phase entry under 35 U.S.C. § 371 of International Application No. PCT/JP2018/015778 filed Apr. 16, 2018, which claims the priority from Japanese Patent Application No. 2017-081604 filed in the Japanese Patent Office on Apr. 17, 2017, the entire contents of which are hereby incorporated by reference.

TECHNICAL FIELD

The present technology relates to a transmission apparatus, a transmission method, a reception apparatus, a reception method, a recording apparatus, and a recording method. More particularly, the present technology relates, for example, to a transmission apparatus for transmitting moving image data having a high frame rate.

BACKGROUND ART

In recent years, there has known a camera which captures images at a high frame rate by using a high-speed frame shutter, and outputs moving image having a high frame rate (refer, for example, to PTL 1). For example, while a normal frame rate is 60 Hz, a high frame rate is 120 Hz, 240 Hz, 480 Hz, or the like.

Further, in recent years, a scheme has been developed in which a container containing a video stream obtained by encoding such high-frame-rate moving image data is generated, and the generated container on a broadcast wave or in a net packet is transmitted. A known container is, for example, MPEG-2 TS (MPEG-2 Transport Stream) or MMT (MPEG Media Transport).

CITATION LIST

Patent Literature

[PTL 1]
Japanese Patent Laid-open No. 2010-178124

SUMMARY

Technical Problem

If a display section of a receiver for receiving moving image data having a high frame rate does not support the high frame rate, the high-frame-rate moving image data is subjected, for example, to thinning or addition processing to obtain normal-frame-rate moving image data and display an image. However, it is conceivable that the image displayed by using the normal-frame-rate moving image data obtained by thinning or addition processing may be unsatisfactory for an image viewer.

An object of the present technology is to make it easy to present an image having appropriate image quality at a receiver side that receives high-frame-rate moving image data.

Solution to Problem

According to an aspect of the present technology, there is provided a transmission apparatus including an encoding section generating a video stream obtained by encoding high-frame-rate moving image data; a transmission section transmitting a container containing the video stream; and an information insertion section inserting blur control information for controlling blur into a layer of the container and/or a layer of the video stream.

The encoding section according to the present technology generates a video stream that is obtained by encoding high-frame-rate moving image data. For example, the high-frame-rate moving image data may be moving image data having a frame rate of 120 Hz, 240 Hz, or 480 Hz. The transmission section transmits the container containing the video stream.

The information insertion section inserts the blur control information, which is used to control blur, into a layer of the container and/or a layer of the video stream. For example, weighting coefficients for neighboring frames may include a negative coefficient.

Further, for example, the blur control information may give the weighting coefficients for individual frames in a blurring process for adding image data of neighboring frames to image data of a current frame. In this case, for example, the neighboring frames may include a past frame and a future frame. Furthermore, in this case, for example, the neighboring frames may include only past frames.

Moreover, for example, the information insertion section may insert, into a layer of the video stream, an SEI message including the blur control information. Likewise, when, for example, inserting the blur control information into a layer of the video stream, the information insertion section may additionally insert, into a layer of the container, identification information indicative of the insertion of the blur control information. When the identification information is inserted into a layer of the container as described above, the receiver side is able to easily recognize, without decoding the video stream, that the blur control information is inserted into a layer of the video stream.

Further, for example, the information insertion section may insert, into a layer of the container, a descriptor including the blur control information. In this case, for example, the container may include an MPEG-2 transport stream, and the descriptor may be inserted into a program map table or an event information table.

Furthermore, for example, the information insertion section may insert a plurality of types of blur control information into a layer of the container and/or a layer of the video stream. When the plurality of types of blur control information are inserted as described above, the receiver side is able to selectively use an appropriate type of blur control information depending, for example, on a display frame rate or on desired image quality.

As described above, the present technology inserts the blur control information, which controls blur, into a layer of a container and/or a layer of a video stream. This enables the receiver side to control blur in accordance with the blur control information, and easily present an image having appropriate image quality.

Further, according to another aspect of the present technology, there is provided a reception apparatus including: a reception section receiving a container containing a video stream obtained by encoding high-frame-rate moving image data; a decoding section decoding the video stream to obtain the high-frame-rate moving image data; and a processing section performing a blurring process on the obtained high-frame-rate moving image data by using blur control information.

The receiving section according to the present technology receives a container containing a video stream that is obtained by encoding high-frame-rate moving image data. The decoding section decodes the video stream to obtain high-frame-rate moving image data. The processing section then performs a blurring process on the obtained high-frame-rate moving image data by using blur control information.

For example, the blur control information may be inserted into a layer of the container and/or a layer of the video stream, and the processing section may use the inserted blur control information or correct the inserted blur control information and use the corrected blur control information. Further, for example, the reception apparatus may additionally include a retention section that retains the blur control information, and the processing section may acquire the blur control information from the retention section and use the acquired blur control information.

Furthermore, for example, a plurality of types of blur control information may be inserted into a layer of the container and/or a layer of the video stream, and the processing section may select, from the plurality of types of blur control information, the blur control information depending on a display frame rate or on desired image quality, and use the selected blur control information. Moreover, for example, when acquiring display image data by decreasing a frame rate of the high-frame-rate moving image data, the processing section may perform a blurring process.

As described above, the present technology performs a blurring process on received high-frame-rate moving image data in accordance with blur control information. This makes it possible to easily present an image having appropriate image quality.

Further, according to yet another aspect of the present technology, there is provided a recording apparatus including: an encoding section generating a video stream obtained by encoding high-frame-rate moving image data; a generation section generating blur control information for controlling blur of the high-frame-rate moving image data; and a recording section recording the video stream and the blur control information inserted into a layer of the video stream and/or a layer of a container containing the video stream.

The encoding section according to the present technology generates a video stream that is obtained by encoding high-frame-rate moving image data. The generation section generates blur control information for controlling the blur of the high-frame-rate moving image data. The recording section then records the video stream and the blur control information inserted into a layer of the video stream and/or a layer of a container containing the video stream.

As described above, the present technology inserts the blur control information, which controls blur, into a layer of a video stream and/or a layer of a container containing the video stream, and records the inserted blur control information. This makes it possible to control, at the time of reproduction, the blur of high-frame-rate moving image data in accordance with the blur control information, and easily present an image having appropriate image quality.

Advantageous Effect of Invention

The present technology makes it easy to present an image having appropriate image quality at a receiver side that receives high-frame-rate moving image data. It should be noted that the advantages described here are not necessarily restrictive. The present technology may provide any advantages described in the present disclosure.

BRIEF DESCRIPTION OF DRAWINGS

FIG. 2 is a set of diagrams illustrating a thinning process performed on high-frame-rate moving image data.

FIG. 8 is a diagram illustrating a first access unit of a GOP in a case where an HEVC is adopted as a coding method.

FIG. 10 is a diagram illustrating an exemplary structure of an HFR blur control SEI message.

FIG. 11 is a diagram illustrating details of major information in the exemplary structure of the HFR blur control SEI message.

FIG. 12 is a set of diagrams illustrating an exemplary structure of an HFR information descriptor and the details of major information in the exemplary structure.

FIG. 13 is a diagram illustrating an exemplary structure of an HFR blur control descriptor.

DESCRIPTION OF EMBODIMENTS

An embodiment for implementing the invention (hereinafter referred to as the "embodiment") will now be described. The description will be given in the following order.

1. Embodiment
2. Exemplary Modifications

1. Embodiment

[Transmission/Reception System]

Figure 1:
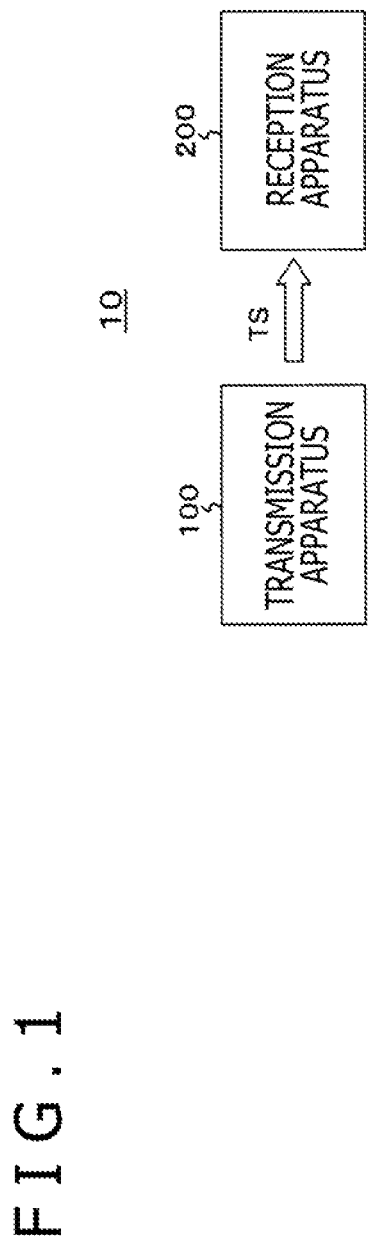
FIG. 1 is a block diagram illustrating an exemplary configuration of a transmission/reception system according to an embodiment of the present technology.

FIG. 1 illustrates an exemplary configuration of a transmission/reception system 10 according to the embodiment. The transmission/reception system 10 includes a transmission apparatus 100 and a reception apparatus 200.

The transmission apparatus 100 generates a transport stream TS as a container, and transmits the generated transport stream TS by placing it on a broadcast wave or in a net packet. The transport stream TS includes a video stream that is obtained by encoding moving image data having a high frame rate, for example, of 120 Hz, 240 Hz, 480 Hz, or the like. In this case, encoding is performed in compliance, for example, with the H.264/AVC standard or the H.265/HEVC standard.

One type of blur control information or a plurality of types of blur control information are inserted into a layer of the transport stream TS and/or a layer of the video stream in order to control blur. Thus, on the receiver side, it is possible to easily acquire the blur control information from a layer of the container or a layer of the video stream.

In the present embodiment, the transmission apparatus 100 inserts a descriptor including the blur control information into a layer of the transport stream TS. Further, in the present embodiment, the transmission apparatus 100 inserts an SEI message including the blur control information into a layer of the video stream. Furthermore, in the present embodiment, the transmission apparatus 100 inserts, into a layer of the transport stream TS, a descriptor that includes identification information indicating that the SEI message including the blur control information is inserted into a layer of the video stream.

The reception apparatus 200 receives a transport stream TS that is transmitted from the transmission apparatus 100 on a broadcast wave or in a net packet. The transport stream TS includes a video stream that is obtained by encoding high-frame-rate moving image data. The blur control information for controlling blur is inserted into a layer of the transport stream TS and/or a layer of the video stream.

The reception apparatus 200 decodes the video stream to obtain moving image data having a high frame rate, and performs a process of blurring the obtained moving image data by using the blur control information. In this case, the reception apparatus 200 selects, from a plurality of types of blur control information, the blur control information depending on a display frame rate or on desired image quality, and uses the selected blur control information.

For example, in a case where high-frame-rate moving image data is to be directly used as display image data, the blur control information depending on desired image quality is selectively used in accordance with a user's selection operation. Further, when, for example, display image data having a relatively low frame rate is to be acquired from high-frame-rate moving image data, blur control information for achieving appropriate image quality is selectively used.

[Blur Control Information]

The blur control information will now be described in detail. As mentioned earlier, the blur control information is used in a blurring process for achieving desired image quality at the receiver side to which high-frame-rate moving image data is transmitted, or in a blurring process for achieving appropriate image quality in a case where the frame rate is decreased.

(a) of FIG. 2 illustrates changes in the signal level of a predetermined pixel during the progression of frames of moving image data having a high frame rate, for example, of 120 Hz. The horizontal axis represents the frames. "0" denotes the current frame, "−n" denotes a frame n frames earlier, and "n" denotes a frame n frames later. It should be noted that the signal level is assumed to have a maximum value of 1.

In a case where the display frame rate is 60 Hz, thinning processing is conventionally performed as depicted, for example, in (b) of FIG. 2 to obtain moving image data having a frame rate of 60 Hz. In this case, the signal of the current frame "0" of the moving image data having a frame rate of 60 Hz is nothing but a signal of the current frame "0" of moving image data having a frame rate of 120 Hz as depicted in (c) of FIG. 2, and does not include signal components of neighboring frames. As a result, a rough image is presented by the moving image data that is generated by such simple thinning processing and has a frame rate of 60 Hz.

Figure 3:
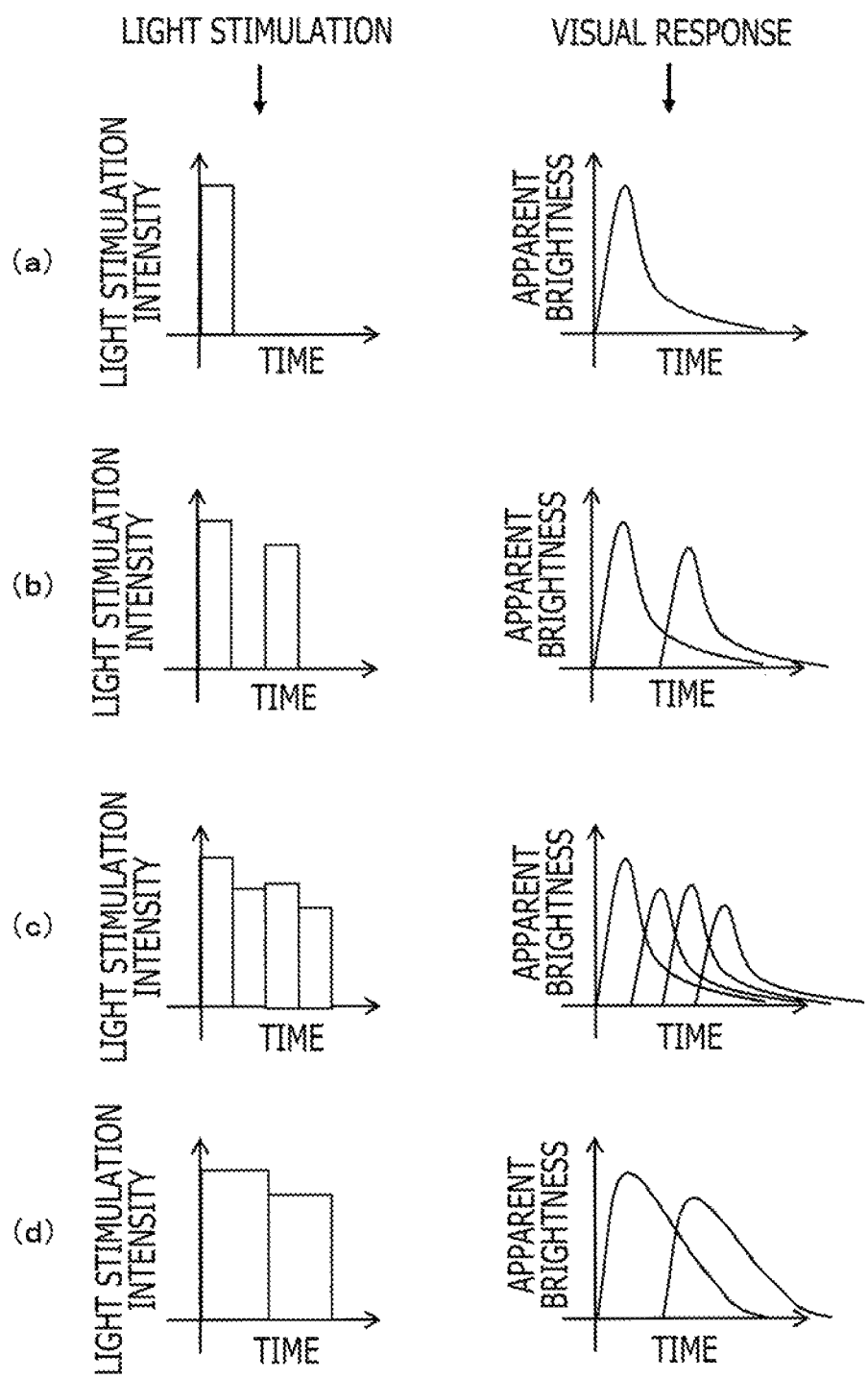
FIG. 3 is a set of diagrams illustrating a relation between light stimulation (left) and visual response (right).

(a) to (d) of FIG. 3 illustrate a relation between light stimulation (left) and visual response (right). As illustrated in (a) of FIG. 3, when light stimulation is presented for a predetermined period of time, apparent brightness is delayed by several tens of milliseconds. Further, as illustrated in (b) of FIG. 3, when light stimulation is presented at fixed time intervals, apparent brightness changes at the same time intervals.

Furthermore, as illustrated in (c) of FIG. 3, when successive light stimulation is presented, apparent brightness also arises successively. Moreover, as illustrated in (d) of FIG. 3, even when successive light stimulation is presented at the same time intervals as depicted in (b) of FIG. 3, apparent brightness arises successively.

Figure 4:
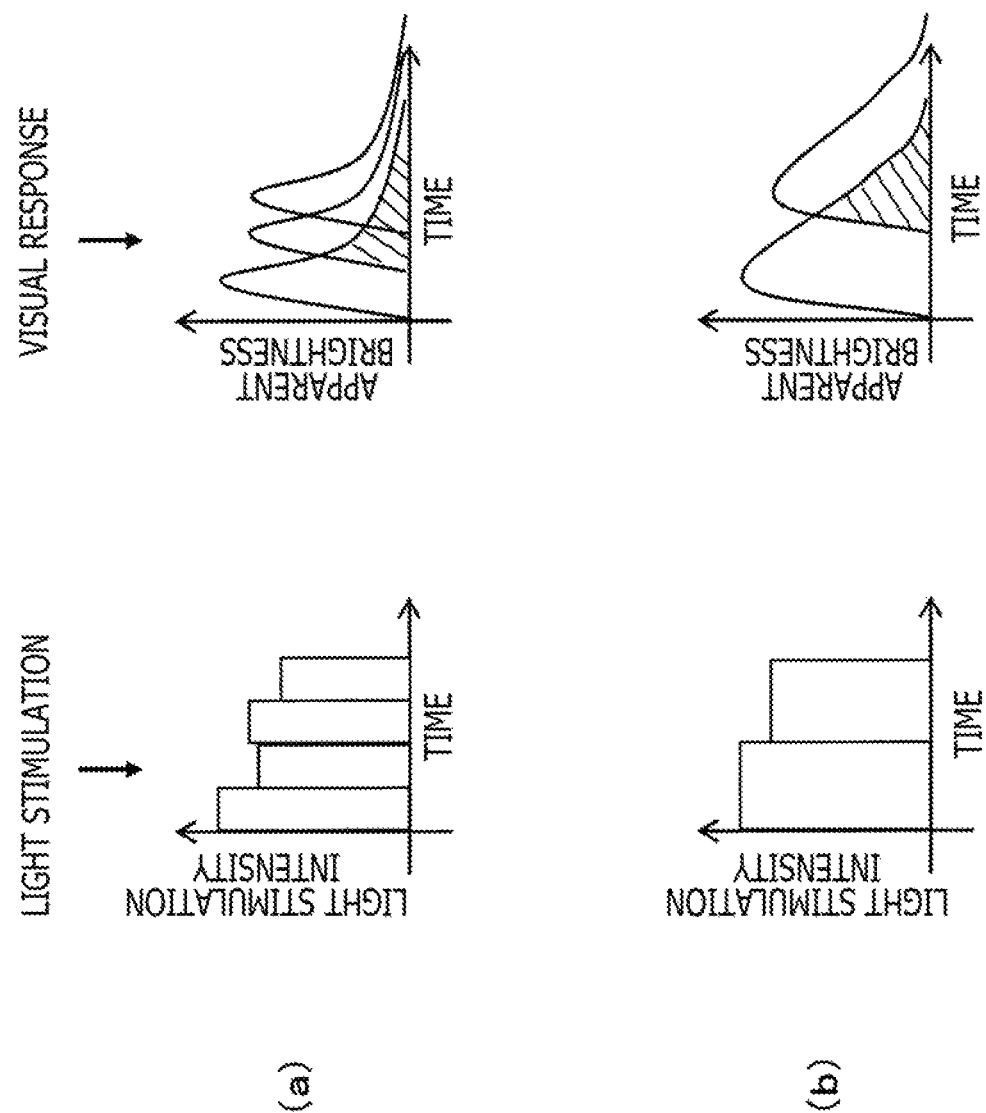
FIG. 4 is a set of diagrams explaining that apparent brightness is affected by preceding light stimulation in accordance with the relation between the light stimulation (left) and the visual response (right).

(a) and (b) of FIG. 4 also illustrate the relation between the light stimulation (left) and the visual response (right). As indicated by a hatched portion in (a) of FIG. 4, apparent brightness is affected by preceding light stimulation. Further, as indicated by a hatched portion in (b) of FIG. 4, when light stimulation is presented for an increased period of time, apparent brightness is also affected by the light stimulation for an increased period of time.

The above-described influence of light stimulation is visible as an overlay (blur) of images (videos). Controlling the amount of such overlay makes it possible to positively change the image quality perceived by an image viewer. In the present embodiment, the blur control information is assumed to be function information that uses frames as parameters. The blur control information gives a weighting coefficient for each frame in a blurring process for adding neighboring-frame image data to current-frame image data.

Figure 5:
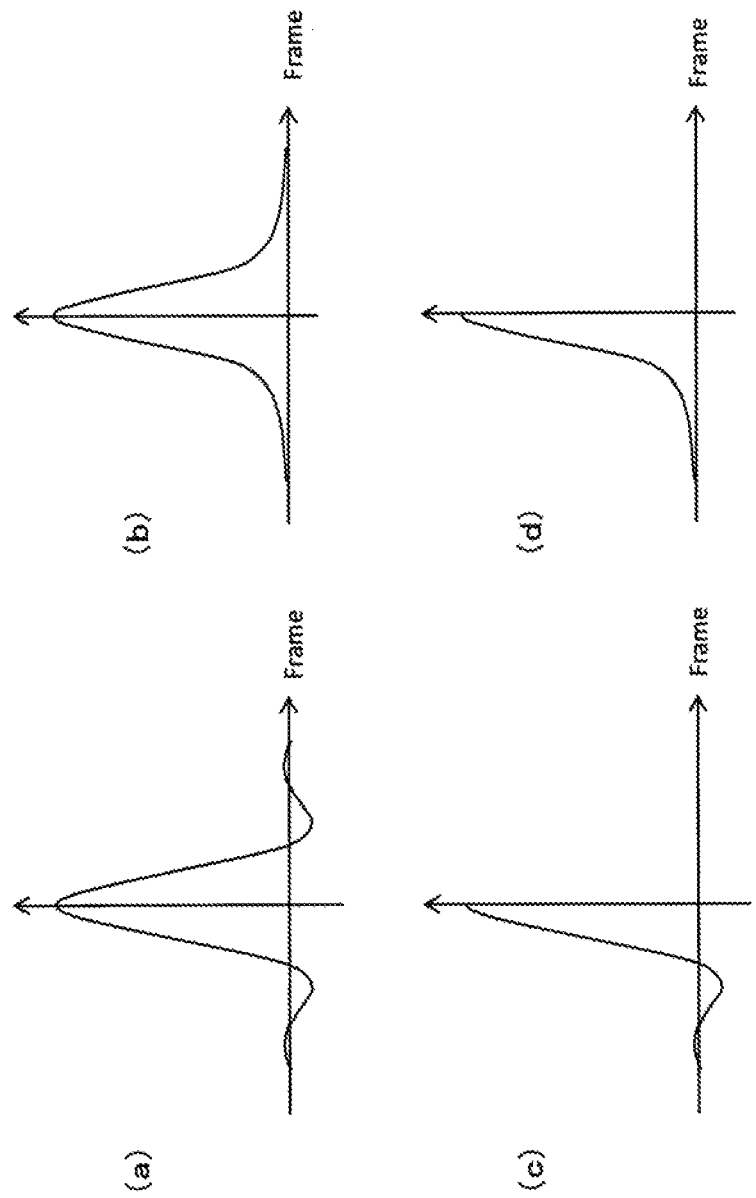
FIG. 5 is a set of diagrams illustrating types of function giving blur control information.

(a) to (d) of FIG. 5 illustrate the types of function. (a) of FIG. 5 depicts an example in which past and future frames are used and a negative coefficient is partly included as the weighting coefficients for the frames. (b) of FIG. 5 depicts an example in which past and future frames are used and no negative coefficient is included as the weighting coefficients for the frames. (c) of FIG. 5 depicts an example in which only past frames are used and a negative coefficient is partly included as the weighting coefficients for the frames. (d) of FIG. 5 depicts an example in which only past frames are used and no negative coefficient is included as the weighting coefficients for the frames.

A plurality of types of blur control information (the weighting coefficients for the individual frames) can be obtained by changing the type of function or by changing the coefficient of the function. For example, in a case where moving image data having a high frame rate is to be directly used as display image data or display moving image data is to be obtained by decreasing the frame rate of the moving image data, it is possible to acquire the blur control information for causing the image viewer to perceive predetermined image quality. Further, when, for example, display moving image data is to be obtained by decreasing the frame rate of high-frame-rate moving image data, it is possible to acquire the blur control information for causing the image viewer to perceive appropriate image quality.

It should be noted that the function information itself may be transmitted in a case where the blur control information is to be transmitted from the transmission apparatus 100 to the reception apparatus 200. However, the present embodiment transmits the weighting coefficients for the individual frames that are given by the function information and used in a blurring process at the receiver side.

Figure 6:
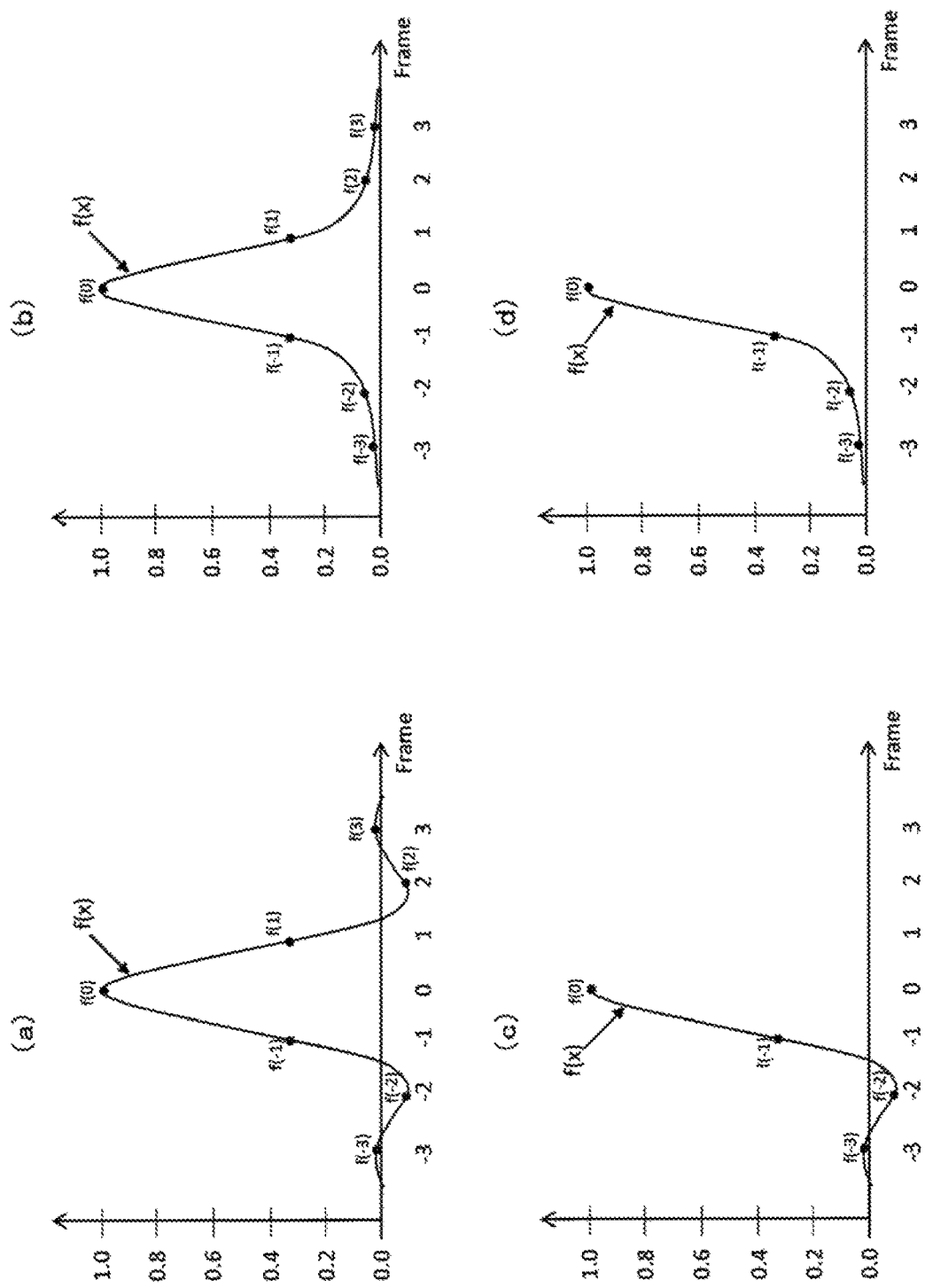
FIG. 6 is a set of diagrams illustrating an exemplary weighting coefficient for each frame that is to be transmitted as the blur control information.

(a) to (d) of FIG. 6 illustrate an exemplary weighting coefficient for each frame that is to be transmitted as the blur control information. The example of (a) of FIG. 6 corresponds to a function type depicted in (a) of FIG. 5, and weighting coefficients f(−3) to f(3), which are the values of the functions f(x) for the frames "−3" to "3," are transmitted as the blur control information. It should be noted that a frame range of "−3" to "3" is illustrative and not restrictive. Past and future frames used need not always be 3, and the number of past frames used need not always be equal to the number of future frames used. The same holds true for the examples of (b) to (d) of FIG. 6.

The example of (b) of FIG. 6 corresponds to a function type depicted in (b) of FIG. 5, and the weighting coefficients f(−3) to f(3), which are the values of the functions f(x) for the frames "−3" to "3," are transmitted as the blur control information. The example of (c) of FIG. 6 corresponds to a function type depicted in (c) of FIG. 5, and the weighting coefficients f(−3) to f(0), which are the values of the functions f(x) for the frames "−3" to "0," are transmitted as the blur control information. The example of (d) of FIG. 6 corresponds to a function type depicted in (d) of FIG. 5, and the weighting coefficients f(−3) to f(0), which are the values of the functions f(x) for the frames "−3" to "0," are transmitted as the blur control information.

[Configuration of Transmission Apparatus]

Figure 7:
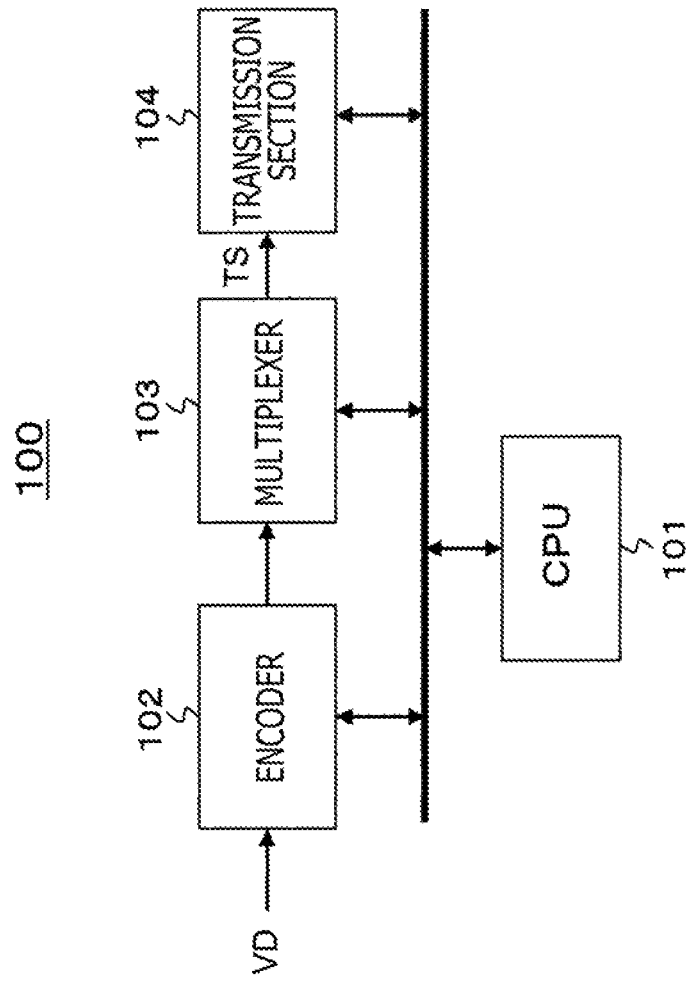
FIG. 7 is a block diagram illustrating an exemplary configuration of a transmission apparatus.

FIG. 7 illustrates an exemplary configuration of the transmission apparatus 100. The transmission apparatus 100 includes a CPU (Central Processing Unit) 101, an encoder 102, a multiplexer 103, and a transmission section 104. The CPU 101 functions as a control section and controls the operations of the various sections of the transmission apparatus 100.

The encoder 102 receives an input of moving image data VD having a high frame rate, for example, of 120 Hz, 240 Hz, 480 Hz, or the like. The high-frame-rate moving image data VD is acquired, for example, by an image capturing apparatus (camera) (not depicted), and is not blurred. The encoder 102 generates a video stream by performing, for example, the H.264/AVC, H.265/HEVC, or other coding process on the moving image data VD.

In the above instance, the encoder 102 inserts the aforementioned blur control information into a layer of the video stream. The blur control information is inserted, for example, in units of pictures, in units of GOPs (Groups Of Pictures), or in units of scenes.

The encoder 102 inserts, into an "SEIs" portion of an access unit (AU), an HFR blur control SEI message (HFR_blur_control SEI message) that is to be newly defined.

Figure 9:
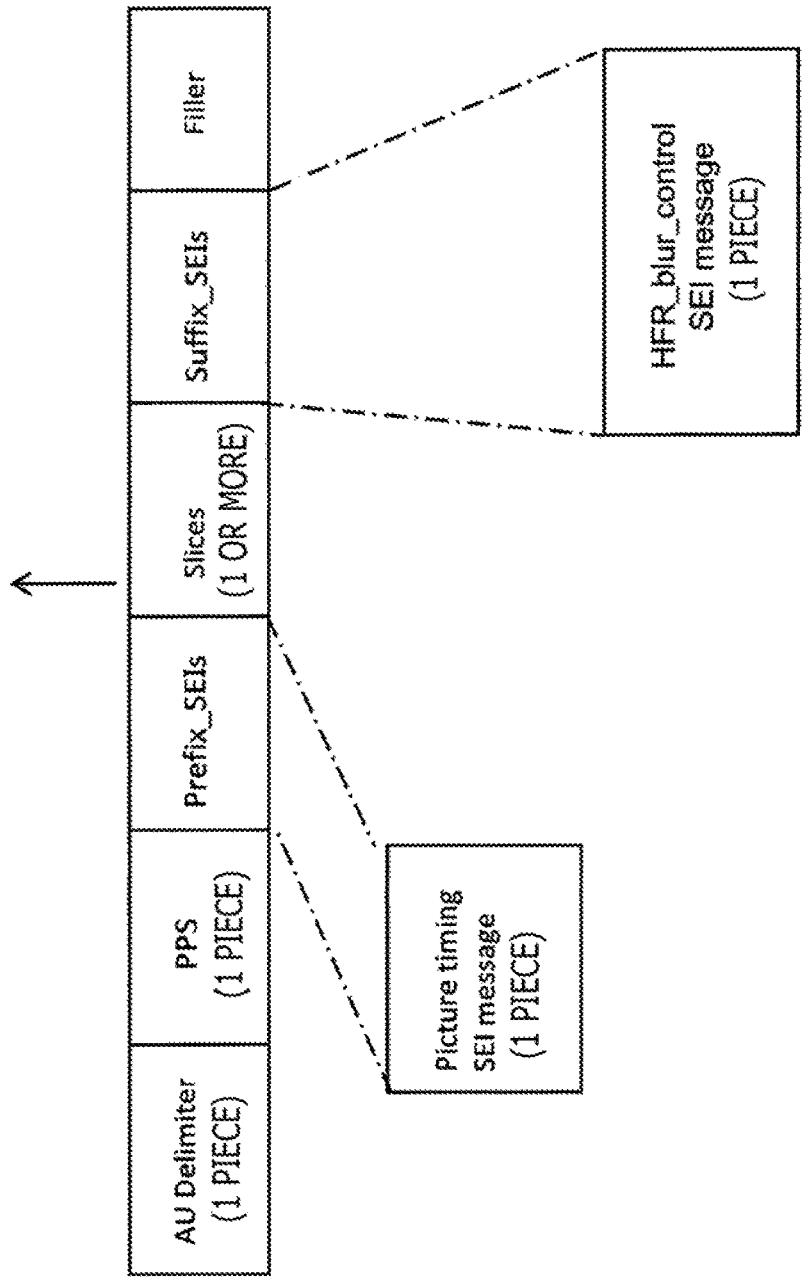
FIG. 9 is a diagram illustrating a GOP's access unit other than the first access unit in a case where the HEVC is adopted as a coding method.

FIG. 8 illustrates a first access unit of a GOP (Group Of Pictures) in a case where the HEVC is adopted as a coding method. Further, FIG. 9 illustrates a GOP's access unit other than the first access unit in a case where the HEVC is adopted as the coding method.

In a case where the HEVC is adopted as the coding method, SEI messages "Prefix_SEIs" for decoding are disposed before slices containing encoded pixel data, and SEI messages "Suffix_SEIs" for display are disposed after the slices. As illustrated in FIGS. 8 and 9, the HFR blur control SEI message is disposed, for example, as the SEI messages "Suffix_SEIs."

FIG. 10 illustrates an exemplary structure (Syntax) of the HFR blur control SEI message. FIG. 11 illustrates the details (Semantics) of major information in the exemplary structure. A "source_frame_rate" field indicates the frame rate of high-frame-rate moving image data to be transmitted. For example, "0x01" denotes 120 Hz, "0x02" denotes 240 Hz, and "0x03" denotes 480 Hz.

A "number_of_blur_control_info" field indicates the number (the number of types) of blur control information to be transmitted. The succeeding information repeatedly exists so as to correspond to the number of types of blur control information to be transmitted. A "display_frame_rate" field indicates the frame rate of display image data. For example, "0x01" denotes 60 Hz, "0x02" denotes 120 Hz, "0x03" denotes 240 Hz, and "0x04" denotes 480 Hz.

A "function_type" field indicates a function type. For example, "0x01" denotes a type that uses the current frame and its preceding frame and partly includes a negative coefficient as the weighting coefficients (see (a) of FIG. 5 and (a) of FIG. 6). Further, "0x02" denotes a type that uses the current frame and its preceding frame and includes no negative coefficient as the weighting coefficients (see (b) of FIG. 5 and (b) of FIG. 6).

Furthermore, "0x03" denotes a type that uses the current frame and its preceding frame and its succeeding frame and partly includes a negative coefficient as the weighting coefficients (see (c) of FIG. 5 and (c) of FIG. 6). Moreover, "0x04" denotes a type that uses the current frame and its preceding frame and its succeeding frame and includes no negative coefficient as the weighting coefficients (see (d) of FIG. 5 and (d) of FIG. 6).

A "start_frame" field indicates the first frame to be used. An "end_frame" field indicates the last frame to be used. For instance, in the cases of the examples of (a) and (b) of FIG. 6, the first frame is "−3" and the last frame is "3." Further, for instance, in the cases of the examples of (c) and (d) of FIG. 6, the first frame is "−3" and the last frame is "0."

A "number_of_frame" field indicates the number of frames to be used. For instance, in the cases of the examples of (a) and (b) of FIG. 6, the number of frames to be used is "7." Further, for instance, in the cases of the examples of (c) and (d) of FIG. 6, the number of frames to be used is "4." The succeeding information repeatedly exists so as to correspond to the number of frames to be used. A "frame_coef (i)" field indicates the weighting coefficient (function value) to be used for each frame.

Returning to FIG. 7, the multiplexer 103 packetizes the video stream generated by the encoder 102 to obtain a PES (Packetized Elementary Stream), converts the PES into a transport packet, and multiplexes the transport packet to obtain a transport stream TS as a multiplexed stream.

In the above instance, the multiplexer 103 inserts, into a layer of the transport stream TS acting as the container, identification information indicating that blur control information is inserted into a layer of the video stream. In the present embodiment, the multiplexer 103 inserts, under a video elementary loop (Video ES loop) of a program map table (PMT) included in the transport stream TS, an HFR information descriptor (HFR_information descriptor) that is to be newly defined.

(a) of FIG. 12 illustrates an exemplary structure (Syntax) of the HFR information descriptor. Further, (b) of FIG. 12 illustrates the details (Semantics) of major information in the exemplary structure.

An 8-bit field named "HFR_information descriptor tag" indicates a descriptor type. Here, this field indicates an HFR information descriptor. An 8-bit field named "HFR_information descriptor length" indicates the length (size) of the descriptor, and expresses the number of subsequent bytes as the length of the descriptor.

A 1-bit field named "HFR_blur_control_SEI_existed" presents flag information indicative of whether or not the HFR blur control SEI message exists in a video layer (a layer of the video stream). For example, "1" indicates that the HFR blur control SEI message exists, and "0" indicates that the HFR blur control SEI message does not exist.

Returning to FIG. 7, the transmission section 104 transmits the transport stream TS, which is obtained by the multiplexer 103, to the reception apparatus 200 on a broadcast wave or in a net packet.

Operations of the transmission apparatus 100 depicted in FIG. 7 will now be briefly described. The encoder 102 receives an input of moving image data VD having a high frame rate, for example, of 120 Hz, 240 Hz, 480 Hz, or the like. The encoder 102 generates a video stream by performing, for example, an H.264/AVC, H.265/HEVC, or other coding process on the moving image data VD.

Further, the encoder 102 inserts the blur control information into a layer of the video stream. More specifically, the encoder 102 inserts, into the "SEIs" portion of the access unit (AU), the HFR blur control SEI message (see FIG. 10) that is to be newly defined.

The video stream generated by the encoder 102 is supplied to the multiplexer 103. The multiplexer 103 packetizes the video stream to obtain a PES, converts the PES into a transport packet, and multiplexes the transport packet to obtain a transport stream TS as a multiplexed stream.

Further, in the multiplexer 103, the identification information indicative of blur control information inserted into a layer of the video stream is inserted into a layer of the transport stream TS acting as the container. More specifically, in the multiplexer 103, the HFR information descriptor (see (a) of FIG. 12) is inserted under the video elementary loop (Video ES loop) of the program map table (PMT).

The transport stream TS generated by the multiplexer 103 is transmitted to the transmission section 104. The transmission section 104 transmits the transport stream TS to the reception apparatus 200 on a broadcast wave or in a net packet.

It should be noted that the above examples deal with the insertion of blur control information into a layer of a video stream. As the HFR blur control SEI message can be most frequently transmitted on an individual picture basis, it is possible to change the blur control information on an individual picture basis. Alternatively, the HFR blur control SEI message can be also transmitted, for example, once per GOP or scene or in coarser units. Meanwhile, even when the HFR blur control SEI message is transmitted on an individual picture basis, it is possible to perform a static operation as far as the value of meta-information remains unchanged.

It is also conceivable that the blur control information may be inserted into a layer of the container instead of being inserted into a layer of the video stream or in addition to being inserted into a layer of the video stream. For example, the multiplexer 103 inserts, under the program map table (PMT), an HFR blur control descriptor (HFR_blur_control descriptor) that is to be newly defined. It is sufficient in a case where a static operation will suffice.

Alternatively, in a case where it is sufficient as far as the blur control information regarding each program is known, it is conceivable that the HFR blur control descriptor may be inserted under an event information table (EIT).

FIG. 13 illustrates an exemplary structure (Syntax) of the HFR blur control descriptor. An 8-bit field named "descriptor_tag" indicates a descriptor type. Here, this field indicates an HFR blur control descriptor. An 8-bit field named "descriptor_length" indicates the length (size) of the descriptor, and expresses the number of subsequent bytes as the length of the descriptor. It should be noted that, although a detailed description is omitted here, the contents of the HFR blur control descriptor are the same as those of the aforementioned HFR blur control SEI message (see FIG. 10).

[Configuration of Transport Stream TS]

Figure 14:
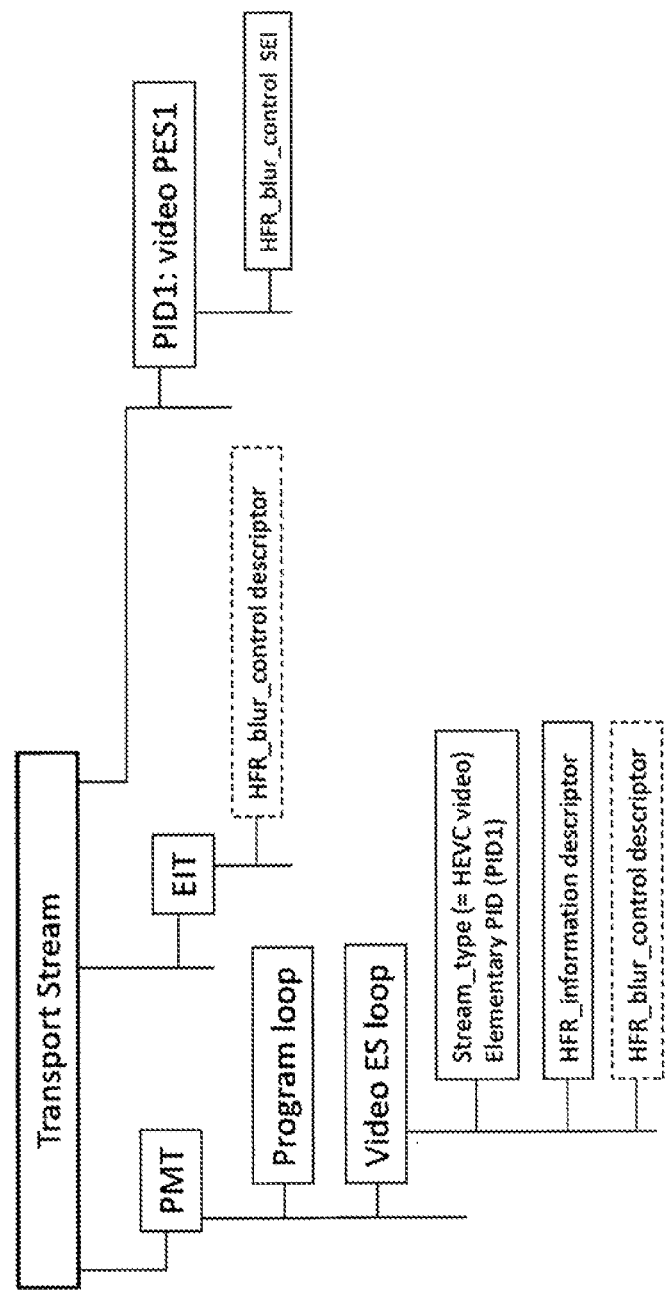
FIG. 14 is a diagram illustrating an exemplary configuration of a transport stream TS.

FIG. 14 illustrates an exemplary configuration of the transport stream TS. A PES packet "video PES1" of the video stream, which is identified by PID1, exists in the present exemplary configuration. The HFR blur control SEI message (HFR_blur_control SEI message) is inserted into the access unit.

Further, the transport stream TS includes the PMT (Program Map Table) as PSI (Program Specific Information). The PSI is information indicative of a program to which each elementary stream included in the transport stream belongs.

An elementary loop having information regarding each elementary stream exists in the PMT. In the present exemplary configuration, a video elementary loop (Video ES loop) exists. Information regarding, for example, a stream type and a packet identifier (PID) is disposed in the video elementary loop in correspondence with one of the above-mentioned video elementary streams. Additionally, a descriptor describing information regarding that video elementary stream is also disposed in the video elementary loop.

As a descriptor, the HFR information descriptor (HFR_information descriptor) is disposed. As mentioned earlier, this descriptor indicates that the HFR blur control SEI message is inserted into a video stream.

Further, as a descriptor, the HFR blur control descriptor (HFR_blur_control_descriptor) may be inserted, in some cases. This descriptor is inserted instead of or in addition to the HFR blur control SEI message.

Furthermore, the transport stream TS includes the EIT (Event Information Table), which acts as SI (Serviced Information) for performing management on an individual event (program) basis. In some cases, the HFR blur control descriptor (HFR_blur_control_descriptor) may be inserted into the EIT. This descriptor is inserted instead of or in addition to the HFR blur control SEI message.

[Configuration of Reception Apparatus]

Figure 15:
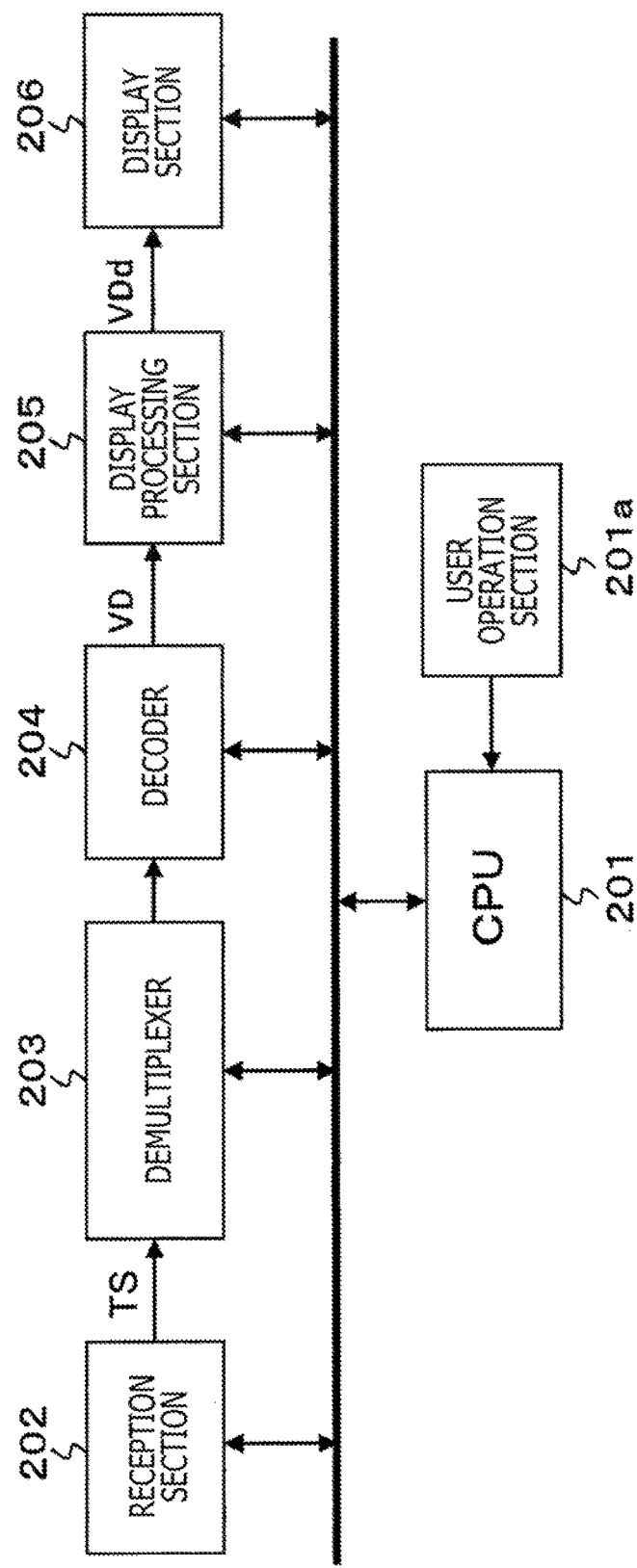
FIG. 15 is a block diagram illustrating an exemplary configuration of a reception apparatus.

FIG. 15 illustrates an exemplary configuration of the reception apparatus 200. The reception apparatus 200 includes a CPU (Central Processing Unit) 201, a user operation section 201a, a reception section 202, a demultiplexer 203, a decoder 204, a display processing section 205, and a display section 206. The CPU 201 functions as a control section and controls the operations of the various sections of the reception apparatus 200.

The reception section 202 receives a transport stream TS that is transmitted from the transmission apparatus 100 on a broadcast wave or in a net packet. The transport stream TS includes a video stream that is obtained by performing an encoding process on high-frame-rate moving image data VD having a frame rate, for example, of 120 Hz, 240 Hz, 480 Hz, or the like.

The demultiplexer 203 performs PID filtering to acquire a video stream from the transport stream TS, and supplies the acquired video stream to the decoder 204. Further, the demultiplexer 203 extracts section information included in a layer of the transport stream TS, and transmits the extracted section information to the CPU 201. In this case, the HFR information descriptor (see (a) of FIG. 12) and the HFR blur control descriptor (see FIG. 13) are also extracted.

The decoder 204 performs a decoding process on the video stream supplied from the demultiplexer 203, and outputs moving image data VD having a high frame rate. Further, the decoder 204 extracts a parameter set and an SEI message that are inserted into each access unit included in the video stream, and transmits the extracted parameter set and the extracted SEI message to the CPU 201. In this case, the HFR blur control SEI message (see FIG. 10) is also extracted.

In accordance with the display capability of the display section 206, the display processing section 205 acquires display image data VDd by performing a frame rate conversion or other process as needed on the moving image data acquired by the decoder 204. For example, in a case where the frame rate of the moving image data DV is 120 Hz and the display section 206 performs a display operation at 120 Hz, the display processing section 205 does not convert the frame rate. Meanwhile, in a case where the frame rate of the moving image data DV is 120 Hz and the display section 206 performs a display operation at 60 Hz, the display processing section 205 converts the frame rate.

When acquiring image data of each frame of the display image data VDd, the display processing section 205 uses the image data of not only the current frame but also the neighboring frames in order to perform a blurring process based on the blur control information (weighting coefficients for individual frames) included in the HFR blur control SEI message and HFR blur control descriptor.

Here, in a case where a plurality of pieces of blur control information are transmitted from the transmitter side, the blur control information to be used is automatically selected by the CPU 201 or arbitrarily selected by a user in accordance, for example, with the frame rate of the moving image data DV and the display frame rate. It should be noted that, for ease of user selection, the CPU 201 may display a UI screen on the display section 206 in order to present information regarding the plurality of pieces of blur control information. It is conceivable that the information regarding the plurality of pieces of blur control information may serve as a reference for selecting the frame rate of the moving image data DV and the display frame rate in consideration, for example, of a case where they are suitable and of the image quality perceivable by the image viewer.

A signal (image data) of a frame having the display image data VDd is calculated by using the signal of the associated frame of the moving image data DV and the signals of its neighboring frames, and is blurred. In this case, the signal of the frame having the moving image data DV and the signals of its neighboring frames are multiplied by their corresponding weighting coefficients and then added together, and the result of such addition is divided by the result of addition of weighting coefficients to obtain the signal of the frame having the display image data VDd.

Figure 16:
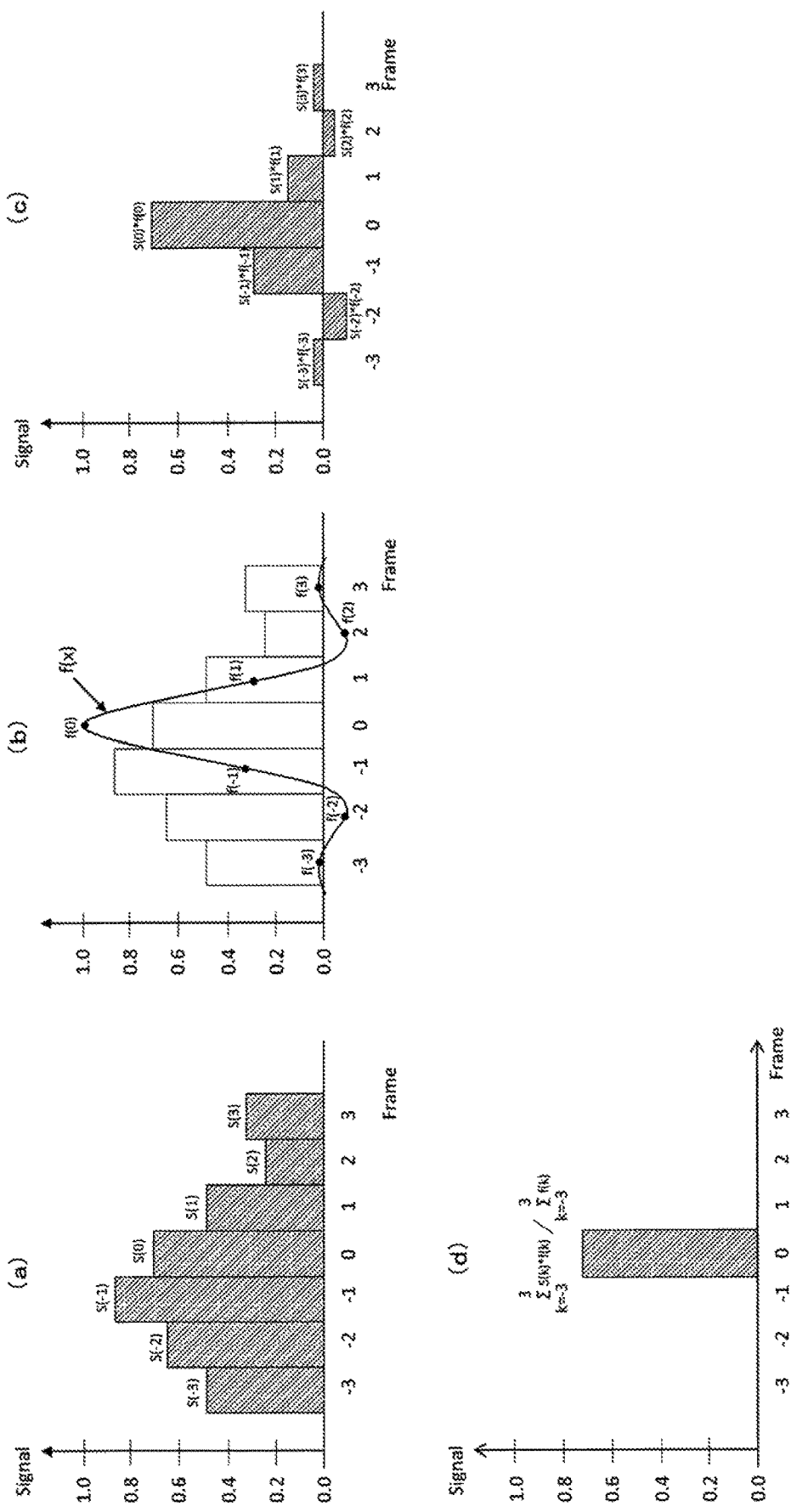
FIG. 16 is a set of diagrams illustrating an example of a process performed to acquire a signal of frame "0" as a frame having display image data VDd.

FIG. 16 illustrates an example of a process performed to acquire the signal of the frame "0" as a frame having the display image data VDd. (a) of FIG. 16 illustrates changes in the signal level of a predetermined pixel during the progression of the frames of moving image data DV having a high frame rate, for example, of 120 Hz. It should be noted that the signal level is assumed to have a maximum value of 1.

(b) of FIG. 16 depicts the blur control information (weighting coefficients for individual frames) that uses the frames "−3" to "3" indicated in (a) of FIG. 6 described above. (c) of FIG. 16 depicts the results that are obtained by multiplying signals S(−3) to S(3) of the respective frames "−3" to "3" of the moving image data DV by their corresponding weighting coefficients f(−3) to f(3). As depicted in (d) of FIG. 16, the signal of the frame "0" of the display image data VDd is represented by a value that is obtained by dividing the sum of the results of multiplication of the frames "−3" to "3" by the sum of the weighting coefficients for the frames "−3" to "3."

Figure 17:
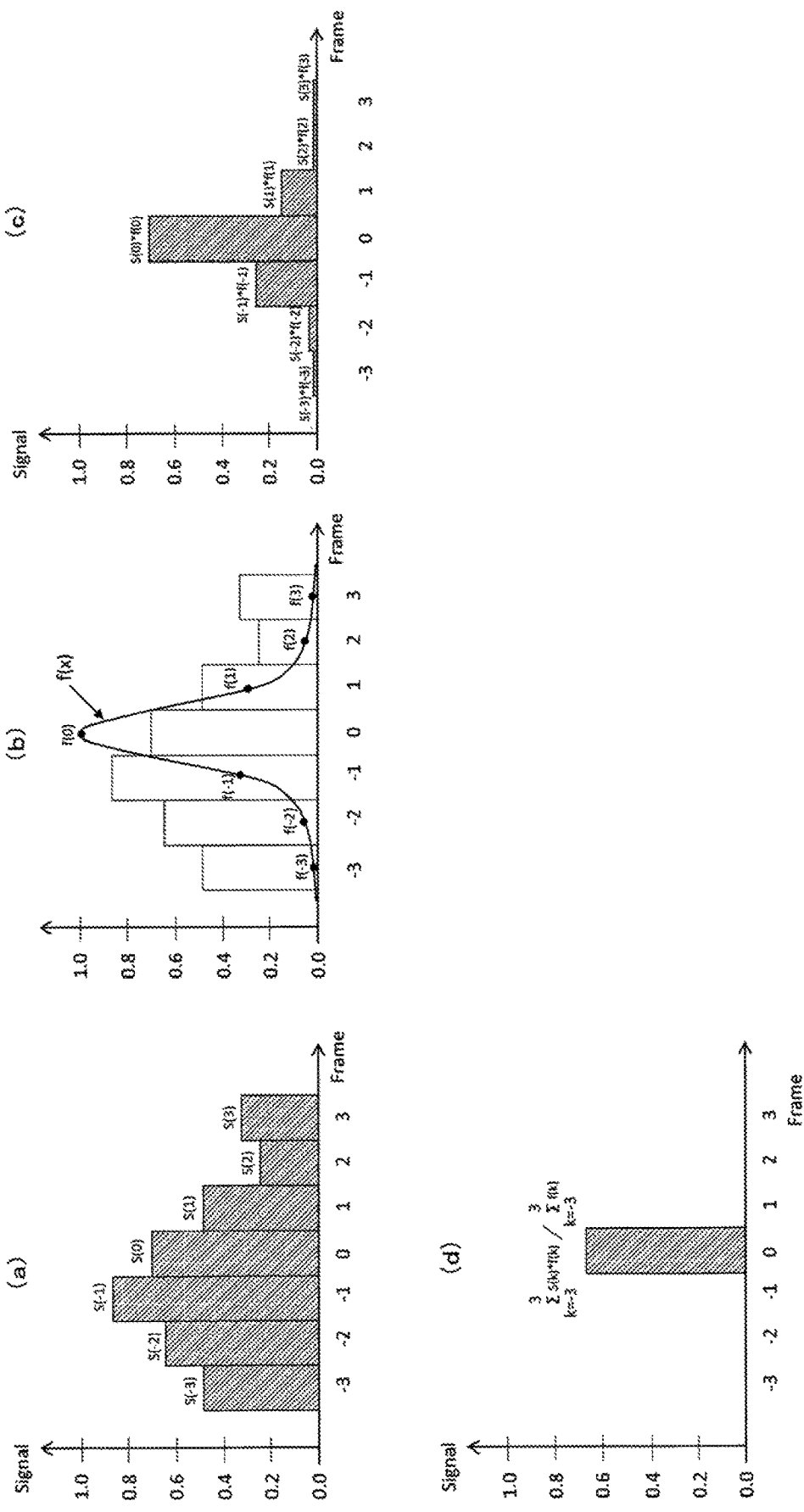
FIG. 17 is a set of diagrams illustrating an example of a process performed to acquire the signal of frame "0" as the frame having the display image data VDd.

FIG. 17 illustrates an example of a process performed to acquire the signal of the frame "0" as the frame having the display image data VDd. (a) of FIG. 17 depicts the same as (a) of FIG. 16. (b) of FIG. 17 depicts the blur control information (weighting coefficients for individual frames) that uses frames "−3" to "3" indicated in (b) of FIG. 6 described above.

(c) of FIG. 17 depicts the results that are obtained by multiplying the signals S(−3) to S(3) of the respective frames "−3" to "3" of the moving image data DV by their corresponding weighting coefficients f(−3) to f(3). As depicted in (d) of FIG. 17, the signal of the frame "0" of the display image data VDd is represented by a value that is obtained by dividing the sum of the results of multiplication of the frames "−3" to "3" by the sum of the weighting coefficients for the frames "−3" to "3."

Figure 18:
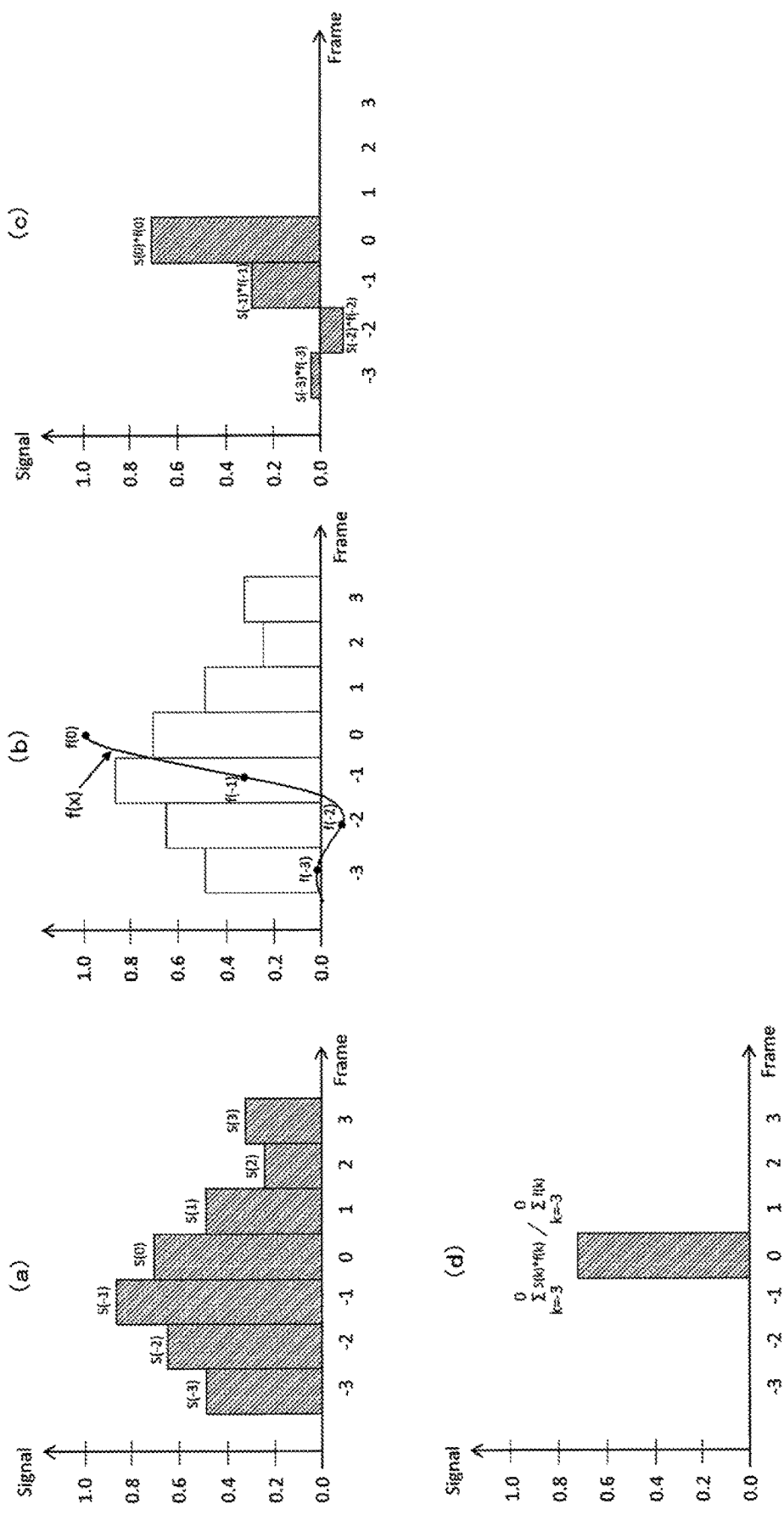
FIG. 18 is a set of diagrams illustrating an example of a process performed to acquire the signal of frame "0" as the frame having the display image data VDd.

FIG. 18 illustrates an example of a process performed to acquire the signal of the frame "0" as the frame having the display image data VDd. (a) of FIG. 18 depicts the same as (a) of FIG. 16. (b) of FIG. 18 depicts the blur control information (weighting coefficients for individual frames) that uses the frames "−3" to "0" indicated in (c) of FIG. 6 described above.

(c) of FIG. 18 depicts the results that are obtained by multiplying the signals S(−3) to S(0) of the respective frames "−3" to "0" of the moving image data DV by their corresponding weighting coefficients f(−3) to f(0). As depicted in (d) of FIG. 18, the signal of the frame "0" of the display image data VDd is represented by a value that is obtained by dividing the sum of the results of multiplication of the frames "−3" to "0" by the sum of the weighting coefficients for the frames "−3" to "0."

Figure 19:
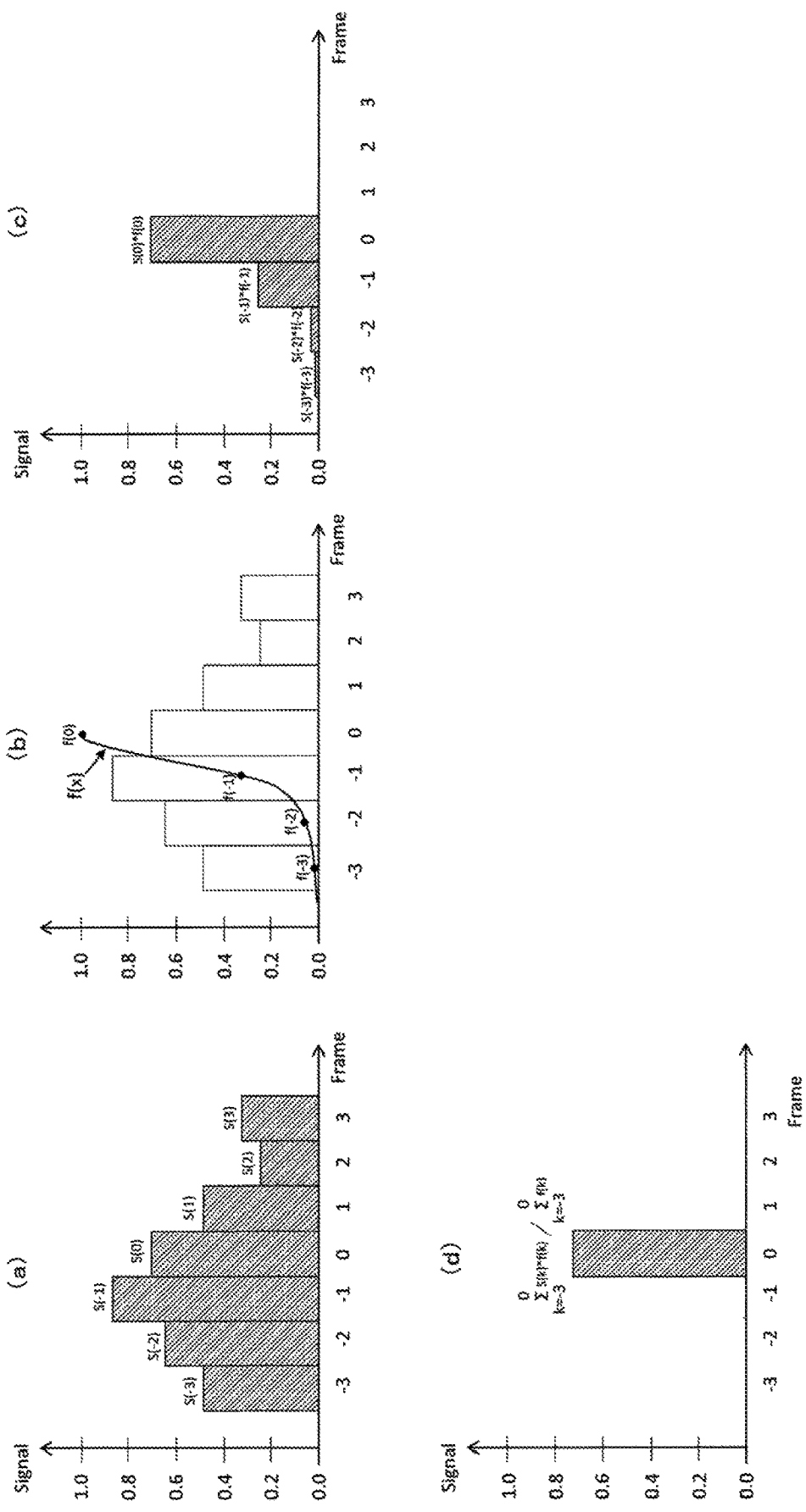
FIG. 19 is a set of diagrams illustrating an example of a process performed to acquire the signal of frame "0" as the frame having the display image data VDd.

FIG. 19 illustrates an example of a process performed to acquire the signal of the frame "0" as the frame having the display image data VDd. (a) of FIG. 19 depicts the same as (a) of FIG. 16. (b) of FIG. 19 depicts the blur control information (weighting coefficients for individual frames) that uses the frames "−3" to "0" indicated in (d) of FIG. 6 described above.

(c) of FIG. 19 depicts the results that are obtained by multiplying the signals S(−3) to S(0) of the respective frames "−3" to "0" of the moving image data DV by their corresponding weighting coefficients f(−3) to f(0). As depicted in (d) of FIG. 19, the signal of the frame "0" of the display image data VDd is represented by a value that is obtained by dividing the sum of the results of multiplication of the frames "−3" to "0" by the sum of the weighting coefficients for the frames "−3" to "0."

Returning to FIG. 15, the display section 206 displays a moving image based on the display image data acquired by the display processing section 205. The display section 206 includes, for example, an LCD (Liquid Crystal Display), an organic EL (Organic Electro-Luminescence) panel, or the like. It should be noted that the display section 206 may be external equipment connected to the reception apparatus 200.

Operations of the reception apparatus 200 depicted in FIG. 15 will now be briefly described. The reception section 202 receives a transport stream TS that is transmitted from the transmission apparatus 100 on a broadcast wave or in a net packet. The transport stream TS is transmitted to the demultiplexer 203. The demultiplexer 203 performs PID filtering to acquire, from the transport stream TS, a video stream that is to be subjected to a decoding process.

Further, the demultiplexer 203 extracts the section information included in a layer of the transport stream TS, and transmits the extracted section information to the CPU 201. In this case, the HFR information descriptor (see (a) of FIG. 12) is also extracted. Additionally, in a case where the HFR blur control descriptor (see FIG. 13) exists, it is also extracted.

Based on the HFR information descriptor, the CPU 201 recognizes that blur control information is inserted into the video stream. Further, the CPU 201 acquires the blur control information from the HFR blur control descriptor.

The video stream acquired by the demultiplexer 203 is supplied to the decoder 204. The decoder 204 performs a decoding process on the video stream to obtain moving image data VD having a high frame rate.

Further, the decoder 204 extracts a parameter set and an SEI message that are inserted into each access unit included in the video stream, and transmits the extracted parameter set and the extracted SEI message to the CPU 201. In this case, the HFR blur control SEI message (see FIG. 10) is also extracted. The CPU 201 acquires blur control information from the HFR blur control SEI message.

The high-frame-rate moving image data DV obtained by the decoder 204 is supplied to the display processing section 205. In accordance with the display capability of the display section 206, the display processing section 205 acquires display image data VDd by performing a frame rate conversion or other process as needed on the moving image data DV acquired by the decoder 204.

Then, when acquiring image data of each frame of the display image data VDd, the display processing section 205 uses the image data of not only the current frame but also the neighboring frames, and a blurring process is performed on the basis of the blur control information (weighting coefficients for individual frames) (see FIGS. 16 to 19).

Here, in a case where a plurality of pieces of blur control information are transmitted from the transmitter side, the blur control information to be used is automatically selected by the CPU 201 or selected by a user operation in accordance, for example, with the frame rate of the moving image data DV, the display frame rate, or the like. For such a user operation, the display section 206 displays, for example, a UI screen listing a plurality of pieces of blur control information.

The display image data DVd outputted from the display processing section 205 is supplied to the display section 206. The display section 206 then displays a moving image based on the display image data DVd.

As described above, in the transmission/reception system 10 depicted in FIG. 1, the transmission apparatus 100 inserts the blur control information, which controls blur, into a layer of the container (transport stream TS) and/or a layer of the video stream. This enables the receiver side to control blur in accordance with the blur control information, and easily present an image having appropriate image quality.

In the transmission/reception system 10 depicted in FIG. 1, the reception apparatus 200 performs a blurring process on the basis of the blur control information inserted into a layer of the container (transport stream TS) and/or a layer of the video stream. This makes it possible to easily present an image having appropriate image quality.

2. Exemplary Modifications

Note that, in the foregoing embodiment, an example has been described in which the blur control information is used to perform the blurring process in order to achieve appropriate image quality when the display image data is to be obtained by decreasing (lowering) the frame rate of high-frame-rate moving image data. However, it is similarly conceivable that the blur control information may be used to perform the blurring process in order to achieve appropriate image quality when the display image data is to be obtained by increasing the frame rate of high-frame-rate moving image data.

Further, in the foregoing embodiment, an example has been described in which the transmitter side adds the blur control information. However, in a case where the transmitter side does not add the blur control information, it is conceivable that the receiver side may use the blur control information pre-stored in a retention section including, for example, a memory. In such a case, it is conceivable that the blur control information may be acquired from a net and retained in the retention section or acquired from a removable recording medium and retained in the retention section. In this case, it is also conceivable that the removable recording medium may directly function as the retention section.

Furthermore, in a case where the transmitter side adds the blur control information, it is conceivable that the receiver side may be allowed to update (correct) the blur control information. In such a case, it is also conceivable that the blur control information for the update may be acquired from a net or from a removable recording medium.

Moreover, in the foregoing embodiment, an example has been described in which the reception apparatus 200 receives, from a broadcast wave or a net, high-frame-rate moving image data to which the blur control information is added. However, it is also conceivable that a certain section of the reception apparatus 200 may acquire, from a USB memory or other removable recording medium, the high-frame-rate moving image data to which the blur control information is added.

Additionally, in the foregoing embodiment, an example has been described in which the blurring process is performed on the high-frame-rate moving image data transmitted from the transmitter side by using the blur control information attached to the high-frame-rate moving image data. Alternatively, however, a recording apparatus may be also adopted to record the high-frame-rate moving image data transmitted from the transmitter side, as content, in a recording section including, for example, a semiconductor memory or the like, and use the recorded content by reproducing it at an appropriate point of time. For example, the reception apparatus 200 may include the recording section.

In the above case, in a case where the blur control information is transmitted from the transmitter side, the high-frame-rate moving image data and the blur control information are also recorded in association with each other. In this case, the blur control information is corrected as needed. Further, in a case where the blur control information is not transmitted from the transmitter side, it is conceivable that the blur control information may be generated at the time of editing or acquired from a net, associated with the high-frame-rate moving image data, and recorded in the recording section together with the high-frame-rate moving image data.

Likewise, in the foregoing embodiment, an example has been described in which, when a container containing a video stream obtained by encoding high-frame-rate moving image data is to be transmitted, the blur control information for controlling blur is inserted into a layer of the container and/or a layer of the video stream. However, it is conceivable that the video stream obtained by encoding high-frame-rate moving image data may be used by recording it, as content, on a predetermined recording medium such as a semiconductor memory. In such a case, it is conceivable that blur control information for controlling the blur of high-frame-rate moving image data may be generated and recorded by inserting it into a layer of the video stream. Alternatively, in a case where the generated blur control information is to be recorded on a recording medium in the form of a container containing the video stream, the generated blur control information may be recorded by inserting it into a layer of the container.

Figure 20:
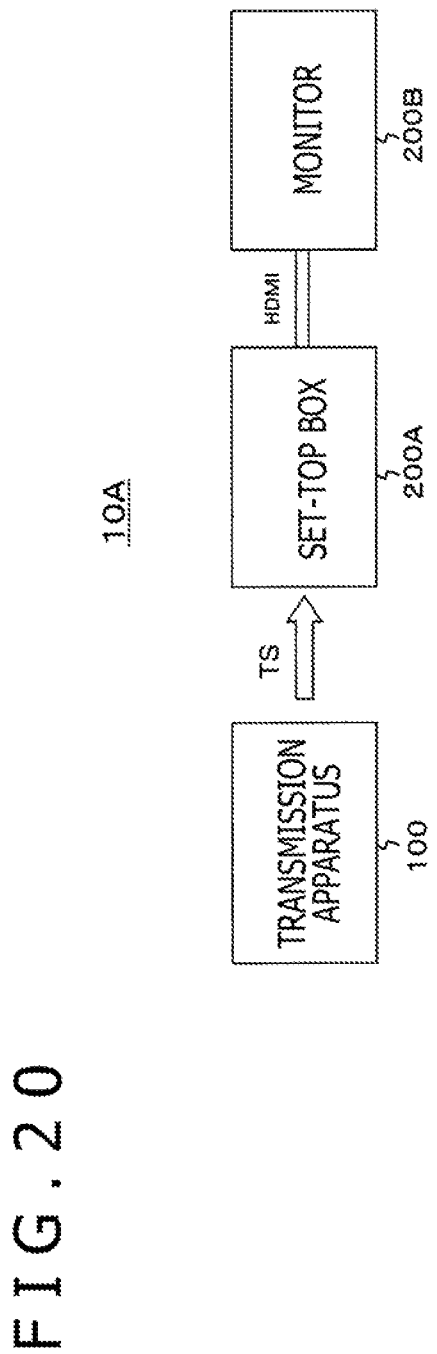
FIG. 20 is a block diagram illustrating another exemplary configuration of the transmission/reception system.

Further, while the transmission/reception system 10 including the transmission apparatus 100 and the reception apparatus 200 has been described above, the transmission/reception system to which the present technology is applicable is not limited to the configuration of the transmission/reception system 10. For example, as is the case with a transmission/reception system 10A depicted in FIG. 20, the reception apparatus 200 may be replaced by a set-top box (STB) 200A and a monitor 200B, which are connected by a digital interface such as an HDMI (High-Definition Multimedia Interface). Incidentally, "HDMI" is a registered trademark.

Also, in the above case, it is conceivable that the set-top box 200A may include the display processing section 205 and the preceding sections or include the decoder 204 and the preceding sections. In a case where the display processing section 205 and the succeeding sections are included in the monitor 200B, uncompressed moving image data DV and blur control information are both transmitted from the set-top box 200A to the monitor 200B. The set-top box 200A transmits, for example, the blur control information by inserting it into a blanking period of the moving image data DV. For example, a "Video displaying InfoFrame" packet is used to transmit the blur control information to the monitor 200B.

Figure 21:
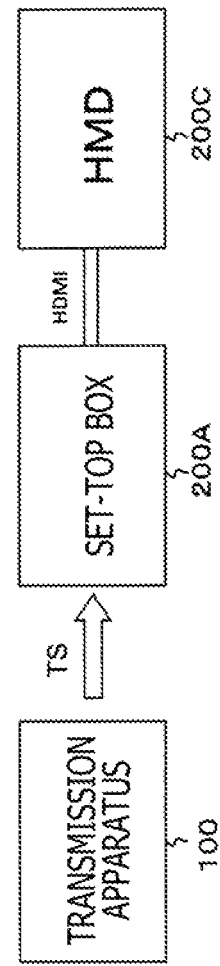
FIG. 21 is a block diagram illustrating yet another exemplary configuration of the transmission/reception system.
Figure 22:
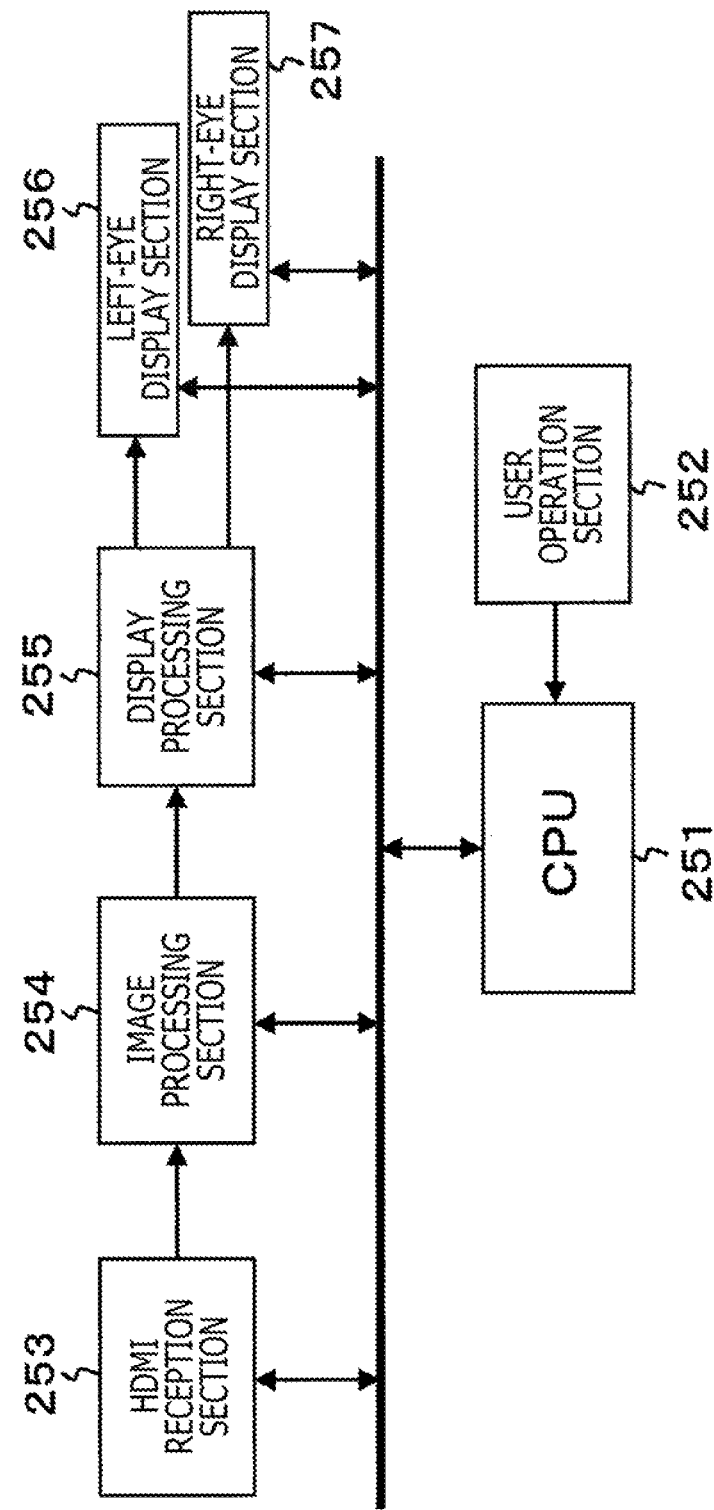
FIG. 22 is a block diagram illustrating an exemplary configuration of an HMD apparatus.

Further, as illustrated in FIG. 21, it is conceivable that a transmission/reception system 10B may be adopted. The transmission/reception system 10B is obtained by replacing the monitor 200B in FIG. 20 by an HMD (head-mounted display) apparatus 200C. FIG. 22 illustrates an exemplary configuration of the HMD apparatus 200C.

The HMD apparatus 200C includes a CPU 251, a user operation section 252, an HDMI reception section 253, an image processing section 254, a display processing section 255, a left-eye display section 256, and a right-eye display section 257. The CPU 251 functions as a control section and controls the operations of the various sections of the HMD apparatus 200C. The user operation section 252, which includes, for example, keys, buttons, a touch panel, or a remote controller, and enables the user to perform various operations.

The HDMI reception section 253, which is configured as an HDMI reception section compliant with the HDMI standard, receives display image data DVd from the set-top box 200A. The image processing section 254 performs scaling, noise reduction, or other signal processing on the display image data DVd inputted from the HDMI reception section 253.

The display control section 255 outputs image data acquired by the image processing section 254 to display the image data on the left-eye display section 256 and the right-eye display section 257. The left-eye display section 256 and the right-eye display section 257 each include a lens block (not depicted in FIG. 22) that magnifies video. The left and right lens blocks each include a combination of a plurality of optical lenses and optically process an image displayed on a display panel.

Images displayed on the display panels of the left-eye display section 256 and right-eye display section 257 are magnified when they pass through the lens blocks, and form large virtual images on the retinas of the user. A left-eye image and a right-eye image are then fused within the brain of the user who is an image viewer. The left-eye display section 256 and the right-eye display section 257 each include, for example, a liquid-crystal display or an organic EL element.

Note that, while the above description states that the HDMI reception section 253 receives the display image data DVd from the set-top box 200A, it is conceivable that the HDMI reception section 253 may receive high-frame-rate moving image data DV and blur control information from the set-top box 200A.

In the above case, the image processing section 254 obtains the display image data VDd by performing a frame rate conversion or other process on the moving image data DV in accordance with the display capabilities of the display panels of the left-eye display section 256 and right-eye display section 257.

Further, as is the case with the display processing section 205 of the reception apparatus 200 depicted in FIG. 15, when acquiring the image data of each frame of the display image data VDd, the image processing section 254 uses the image data of not only the current frame but also the neighboring frames in order to perform a blurring process on the basis of the blur control information (weighting coefficients for individual frames) (see FIGS. 16 to 19).

As described above, the HMD apparatus 200C also displays an image based on the display image data VDd that is blurred in accordance with the blur control information. Therefore, it is possible to easily present an image having appropriate image quality.

Note that it is also conceivable that the blur control information may be transmitted from the set-top box 200A to the monitor 200B or to the HMD apparatus 200C by using a different "InfoFrame" packet such as a "Vender Specific InfoFrame" instead of using the "Video displaying InfoFrame" packet. Furthermore, it is also conceivable that the blur control information may be transmitted through a CEC line or an HEC communication line.

Moreover, in the foregoing embodiment, an example has been described in which a transport stream (MPEG-2 TS) is used as the container. However, the present technology is similarly applicable to a system having a configuration in which a distribution is made to a reception terminal by using a network such as the Internet. When the Internet is used for distribution purposes, the distribution is frequently made by using a container in an MP4 or other format. More specifically, containers in various formats may be used, including a container in a transport stream (MPEG-2 TS) format compliant with the digital broadcast standard, a container in an MMT (MPEG Media Transport) format, and a container in an MP4 format adopted for Internet distribution.

Further, the present technology may adopt the following configurations.

(1) A transmission apparatus including:

an encoding section generating a video stream obtained by encoding high-frame-rate moving image data;

a transmission section transmitting a container containing the video stream; and an information insertion section inserting blur control information for controlling blur into a layer of the container and/or a layer of the video stream.

(2) The transmission apparatus according to (1) described above, in which the blur control information gives weighting coefficients for individual frames in a blurring process for adding image data of neighboring frames to image data of a current frame.

(3) The transmission apparatus according to (2) described above, in which the neighboring frames include a past frame and a future frame.

(4) The transmission apparatus according to (2) described above, in which the neighboring frames include only past frames.

(5) The transmission apparatus according to any of (2) to (4) described above, in which the weighting coefficients for the neighboring frames include a negative coefficient.

(6) The transmission apparatus according to any of (1) to (5) described above, in which the high-frame-rate moving image data includes moving image data having a frame rate of 120 Hz, 240 Hz, or 480 Hz.

(7) The transmission apparatus according to any of (1) to (6) described above, in which the information insertion section inserts an SEI message including the blur control information into a layer of the video stream.

(8) The transmission apparatus according to any of (1) to (7) described above, in which when inserting the blur control information into a layer of the video stream, the information insertion section additionally inserts, into a layer of the container, identification information indicative of the insertion of the blur control information.

(9) The transmission apparatus according to any of (1) to (8) described above, in which the information insertion section inserts a descriptor including the blur control information into a layer of the container.

(10) The transmission apparatus according to (9) described above, in which the container includes an MPEG2 transport stream, and the descriptor is inserted into a program map table or an event information table.

(11) The transmission apparatus according to any of (1) to (10) described above, in which the information insertion section inserts a plurality of types of the blur control information into a layer of the container and/or a layer of the video stream.

(12) A transmission method including:

an image encoding step of generating, by an image encoding section, a video stream that is obtained by encoding moving image data having a high frame rate;

a transmission step of transmitting, by a transmission section, a container containing the video stream; and an information insertion step of inserting, by an information insertion section, blur control information for controlling blur into a layer of the container and/or a layer of the video stream.

(13) A reception apparatus including:

a reception section receiving a container containing a video stream obtained by encoding high-frame-rate moving image data;

a decoding section decoding the video stream to obtain the high-frame-rate moving image data; and a processing section performing a blurring process on the obtained high-frame-rate moving image data by using blur control information.

(14) The reception apparatus according to (13) described above, in which the blur control information is inserted into a layer of the container and/or a layer of the video stream, and the processing section uses the inserted blur control information or corrects the inserted blur control information and uses the corrected blur control information.

(15) The reception apparatus according to (13) described above, further including:

a retention section retaining the blur control information, in which the processing section acquires the blur control information from the retention section and uses the acquired blur control information.

(16) The reception apparatus according to (13) described above, in which a plurality of types of the blur control information is inserted into a layer of the container and/or a layer of the video stream, and the processing section select, from the plurality of types of the blur control information, the blur control information depending on a display frame rate or on desired image quality, and use the selected blur control information.

(17) The reception apparatus according to any of (13) to (16) described above, in which when acquiring display image data by decreasing a frame rate of the high-frame-rate moving image data, the processing section performs a blurring process.

(18) A reception method including:

a reception step of receiving, by a reception section, a container containing a video stream that is obtained by encoding high-frame-rate moving image data;

a decoding step of decoding, by a decoding section, the video stream to obtain the high-frame-rate moving image data; and a processing step of performing, by a processing section, a blurring process on the obtained high-frame-rate moving image data by using blur control information for controlling blur, the blur control information being inserted into a layer of the container and/or a layer of the video stream.

(19) A recording apparatus including:

an encoding section generating a video stream obtained by encoding high-frame-rate moving image data;

a generation section generating blur control information for controlling blur of the high-frame-rate moving image data; and a recording section recording the video stream and the blur control information inserted into a layer of the video stream and/or a layer of a container containing the video stream.

(20) A recording method including:

an encoding step of generating, by an encoding section, a video stream that is obtained by encoding high-frame-rate moving image data;

a generation step of generating, by a generation section, blur control information for controlling blur of the high-frame-rate moving image data; and a recording step of recording, by a recording section, the video stream and the blur control information inserted into a layer of the video stream and/or a layer of a container containing the video stream.

REFERENCE SIGNS LIST 10, 10A, 10B . . . Transmission/reception system
100 . . . Transmission apparatus
101 . . . CPU
102 . . . Encoder
103 . . . Multiplexer
104 . . . Transmission section
200 . . . Reception apparatus
200A . . . Set-top box
200B . . . Monitor
200C . . . HMD apparatus
201 . . . CPU
201a . . . User operation section
202 . . . Reception section
203 . . . Demultiplexer
204 . . . Decoder
205 . . . Display processing section
206 . . . Display section
251 . . . CPU
252 . . . User operation section
253 . . . HDMI reception section
254 . . . Image processing section
255 . . . Display processing section
256 . . . Left-eye display section
257 . . . Right-eye display section

The invention claimed is:

1. A transmission apparatus comprising:
encoding circuitry configured to generate a video stream obtained by encoding high-frame-rate moving image data;
transmission circuitry configured to transmit a container containing the video stream; and
processing circuitry configured to insert blur control information for controlling blur into a layer of the container and/or a layer of the video stream, the blur control information comprising weighting coefficients for combining a current frame and at least one neighboring frame in a blurring process, the weighting coefficients respectively corresponding to the current frame and the at least one neighboring frame and varying on a frame-to-frame basis.

2. A reception apparatus comprising:
reception circuitry configured to receive a container containing a video stream obtained by encoding high-frame-rate moving image data; and processing circuitry configured to:
decode the video stream to obtain the high-frame-rate moving image data; and
perform a blurring process on the obtained high-frame-rate moving image data by using blur control information, the blur control information comprising weighting coefficients for combining a current frame and at least one neighboring frame in the blurring process, the weighting coefficients respectively corresponding to the current frame and the at least one neighboring frame and varying on a frame-to-frame basis.

3. The reception apparatus according to claim 2, wherein the at least one neighboring frame includes only past frames.

4. The reception apparatus according to claim 2, wherein the weighting coefficients for the at least one neighboring frame include a negative coefficient.

5. The reception apparatus according to claim 2, wherein the high-frame-rate moving image data includes moving image data having a frame rate of 120 Hz, 240 Hz, or 480 Hz.

6. The reception apparatus according to claim 2, wherein an SEI message including the blur control information is in a layer of the video stream.

7. The reception apparatus according to claim 2, wherein a layer of the container includes identification information indicative of the presence of the blur control information.

8. The reception apparatus according to claim 2, wherein a descriptor including the blur control information is in a layer of the container.

9. The reception apparatus according to claim 2, wherein:
the container includes an MPEG2 transport stream, and
a descriptor including the blur contorl information is in a program map table or an event information table.

10. The reception apparatus according to claim 2, wherein a plurality of types of the blur control information are in a layer of the container and/or a layer of the video stream.

11. A transmission method comprising:
encoding moving image data having a high frame rate to generate a video stream;
transmitting a container containing the video stream; and
inserting blur control information for controlling blur into a layer of the container and/or a layer of the video stream, the blur control information comprising weighting coefficients for combining a current frame and at least one neighboring frame in a blurring process, the weighting coefficients respectively corresponding to the current frame and the at least one neighboring frame and varying on a frame-to-frame basis.

12. The reception apparatus according to claim 2, wherein the at least one neighboring frame includes a past frame and a future frame.

13. The reception apparatus according to claim 2, wherein the blur control information is in a layer of the container and/or a layer of the video stream, and
the processing circuitry is configured to use the inserted blur control information or to correct the inserted blur control information and to use the corrected blur control information.

14. The reception apparatus according to claim 2, further comprising retention circuitry configured to retain the blur control information, wherein the processing is configured to acquire the blur control information from the retention section and to use the acquired blur control information.

15. The reception apparatus according to claim 2, wherein:

a plurality of types of the blur control information are in a layer of the container and/or a layer of the video stream, and the processing circuitry is configured to:

select from the plurality of types of the blur control information, the blur control information depending on a display frame rate or on desired image quality, and use the selected blur control information.

16. The reception apparatus according to claim 2, wherein the processing circuitry is configured to perform the blurring process when acquiring display image data by decreasing a frame rate of the high-frame-rate moving image data.

17. A reception method comprising:

receiving a container containing a video stream that includes encoded high-frame-rate moving image data;

decoding the video stream to obtain the high-frame-rate moving image data; and performing a blurring process on the obtained high-frame-rate moving image data by using blur control information for controlling blur, the blur control information comprising weighting coefficients for combining a current frame and at least one neighboring frame in the blurring process, the weighting coefficients respectively corresponding to the current frame and the at least one neighboring frame and varying on a frame-to-frame basis.

18. A recording apparatus comprising:

encoding circuitry configured to generate a video stream obtained by encoding high-frame-rate moving image data;

generation circuitry configured to generate blur control information for controlling blur of the high-frame-rate moving image data; and recording circuitry configured to record the video stream and the blur control information inserted into a layer of the video stream and/or a layer of a container containing the video stream, the blur control information comprising weighting coefficients for combining a current frame and at least one neighboring frame in a blurring process, the weighting coefficients respectively corresponding to the current frame and the at least one neighboring frame and varying on a frame-to-frame basis.

19. A recording method comprising:

encoding high-frame-rate moving image data to generate a video stream;

generating blur control information for controlling blur of the high-frame-rate moving image data; and recording the video stream and the blur control information inserted into a layer of the video stream and/or a layer of a container containing the video stream, the blur control information comprising weighting coefficients for combining a current frame and at least one neighboring frame in a blurring process, the weighting coefficients respectively corresponding to the current frame and the at least one neighboring frame and varying on a frame-to-frame basis.

* * * * *